(12) United States Patent
Adler et al.

(10) Patent No.: US 9,988,502 B2
(45) Date of Patent: Jun. 5, 2018

(54) ELASTOMER COMPOSITES, BLENDS AND METHODS FOR PREPARING SAME

(71) Applicant: Cabot Corporation, Boston, MA (US)

(72) Inventors: Gerald D. Adler, Charlestown, MA (US); Anand Prakash, Wilmington, MA (US); Ralph E. Dickinson, Dracut, MA (US); Vijay R. Tirumala, Waltham, MA (US)

(73) Assignee: Cabot Corporation, Boston, MA (US)

( * ) Notice: Subject to any disclaimer, the term of this patent is extended or adjusted under 35 U.S.C. 154(b) by 0 days. days.

(21) Appl. No.: 14/786,628

(22) PCT Filed: May 19, 2014

(86) PCT No.: PCT/US2014/038565
§ 371 (c)(1),
(2) Date: Oct. 23, 2015

(87) PCT Pub. No.: WO2014/189826
PCT Pub. Date: Nov. 27, 2014

(65) Prior Publication Data
US 2016/0075836 A1 Mar. 17, 2016

Related U.S. Application Data

(60) Provisional application No. 61/825,203, filed on May 20, 2013.

(51) Int. Cl.
| C08J 3/22 | (2006.01) |
| C08L 7/00 | (2006.01) |
| C08K 3/04 | (2006.01) |
| C08K 3/06 | (2006.01) |
| C08K 3/22 | (2006.01) |
| C08K 5/09 | (2006.01) |
| C08K 5/18 | (2006.01) |
| C08K 5/47 | (2006.01) |
| C08L 9/00 | (2006.01) |

(52) U.S. Cl.
CPC .............. *C08J 3/22* (2013.01); *C08J 3/226* (2013.01); *C08K 3/04* (2013.01); *C08K 3/06* (2013.01); *C08K 3/22* (2013.01); *C08K 5/09* (2013.01); *C08K 5/18* (2013.01); *C08K 5/47* (2013.01); *C08L 7/00* (2013.01); *C08L 9/00* (2013.01); *C08J 2307/00* (2013.01); *C08J 2407/00* (2013.01); *C08J 2409/00* (2013.01); *C08K 2003/2296* (2013.01); *C08L 2205/025* (2013.01); *C08L 2310/00* (2013.01)

(58) Field of Classification Search
CPC ................ C08J 3/22; C08J 3/226; C08K 3/04
USPC .................... 523/351; 524/495, 496
See application file for complete search history.

(56) References Cited

U.S. PATENT DOCUMENTS

| 3,048,559 | A | 8/1962 | Heller et al. |
| 6,048,923 | A | 4/2000 | Mabry et al. |
| 6,075,084 | A | 6/2000 | Mabry et al. |
| 6,365,663 | B2 | 4/2002 | Mabry et al. |
| 7,105,595 | B2 | 9/2006 | Mabry et al. |
| 2002/0016404 | A1 | 2/2002 | Mabry et al. |
| 2009/0062428 | A1 | 3/2009 | Zhang et al. |
| 2011/0021664 | A1 | 1/2011 | Wang et al. |
| 2012/0172492 | A1* | 7/2012 | Wang .................... B01F 5/0646 523/352 |
| 2012/0172517 | A1 | 7/2012 | Zhang et al. |
| 2012/0283355 | A1 | 11/2012 | Zhang et al. |
| 2013/0281570 | A1 | 10/2013 | Takashi |
| 2013/0317137 | A1 | 11/2013 | Thomasson et al. |
| 2014/0045989 | A1 | 2/2014 | Wang et al. |
| 2014/0256846 | A1 | 9/2014 | Sevignon et al. |
| 2014/0378575 | A1 | 12/2014 | Sevignon et al. |

FOREIGN PATENT DOCUMENTS

| JP | 2008/231152 | 10/2008 |
| JP | 2013/505324 A | 2/2013 |
| KR | 2010/0059918 | 6/2010 |
| WO | WO 96/18688 | 6/1996 |
| WO | WO 2009/099623 A1 | 8/2009 |
| WO | WO 2011/034581 A2 | 3/2011 |
| WO | WO 2011/034585 A2 | 3/2011 |
| WO | WO 2012/127728 A1 | 9/2012 |

OTHER PUBLICATIONS

ASTM D6556-10, "Standard Test Method for Carbon Black—Total and External Surface Area by Nitrogen Adsorption", ASTM International, 2012, pp. 1-6.
The International Search Report and The Written Opinion of the International Searching Authority, or the Declaration of International Application No. PCT/US2014/038565, dated Sep. 17, 2014.
Prakash et al., "Creating Superior Fatigue and Abrasion Resistant Rubber Compounds Through Liquid Phase Mixing," Presented at the Fall 182$^{nd}$ Technical Meeting of Rubber Division, ACS, Cincinnati, OH, Oct. 9-11, 2012.
Wang, M-J, et al., "NR/Carbon Black Masterbatch Produced with Continuous Liquid Phase Mixing", Cabot Corporation, International Seminar on "Continuous Mixing", DIK, Hanover, Germany, Dec. 10-11, 2001.

* cited by examiner

*Primary Examiner* — Edward J Cain

(57) ABSTRACT

Blends of elastomer composites with unfilled or less highly filled elastomer reduces hysteresis without compromising reinforcement. Hysteresis may also be reduced by adjusting the compounding method.

20 Claims, 9 Drawing Sheets

ELASTOMER COMPOSITES, BLENDS AND METHODS FOR PREPARING SAME

This application is a national phase application of PCT/US14/028565, filed on May 19, 2014, which claims priority from U.S. 61/825,203, filed May 20, 2013, the entire contents of which are incorporated herein by reference.

BACKGROUND OF THE INVENTION

Numerous products of commercial significance are formed of elastomeric compositions wherein particulate filler is dispersed in any of various synthetic elastomers, natural rubber or elastomer blends. Carbon black (abbreviated herein as CB), for example, is widely used as a reinforcing agent in natural rubber and other elastomers. It is common to produce a masterbatch, that is, a premixture of filler, elastomer and various optional additives, such as extender oil, and then in some cases to blend such masterbatch with additional elastomer in a subsequent mixing step.

Carbon black masterbatch is prepared with different grades of commercially available carbon black which vary both in surface area per unit weight and in structure, which describes the size and complexity of aggregates of carbon black formed by the fusion of primary carbon black particles to one another. Numerous products of commercial significance are formed of such elastomeric compositions of carbon black particulate filler dispersed in natural rubber. Such products include, for example, vehicle tires wherein different elastomeric compositions may be used for the tread portion, sidewalls, wire skim and carcass. Other products include, for instance, engine mount bushings, conveyor belts, windshield wipers and the like.

Good dispersion of carbon black in natural rubber compounds has been recognized for some time as one of the most important objectives for achieving good quality and consistent product performance, and considerable effort has been devoted to the development of procedures for assessing dispersion quality in rubber. The mixing operations have a direct impact on mixing efficiency and on macro-dispersion. In general, better carbon black macro-dispersion is achieved in a dry-mixed masterbatch by longer mixing and by more intensive mixing. Unfortunately, however, achieving better macro-dispersion by longer, more intensive mixing degrades the elastomer into which the carbon black is being dispersed. This is especially problematic in the case of natural rubber, which is highly susceptible to mechanical/thermal degradation. Longer and more intensive mixing, using known mixing techniques and apparatus, such as an internal mixer, reduces the molecular weight of the natural rubber masterbatch-composition. Thus, improved macro-dispersion of carbon black in natural rubber is known to be achieved with a corresponding, generally undesirable reduction in the molecular weight of the rubber.

In addition to dry mixing techniques, it is known to continuously feed latex and a carbon black slurry to an agitated coagulation tank. Such "wet" techniques are often used with synthetic elastomer, such as styrene butadiene rubber (SBR). The coagulation tank contains a coagulant such as salt or an aqueous acid solution typically having a pH of about 2.5 to 4. The latex and carbon black slurry are mixed and coagulated in the coagulation tank into small beads (typically a few millimeters in diameter) referred to as wet crumb. The crumb and acid effluent are separated, typically by means of a vibrating shaker screen or the like. The crumb is then dumped into a second agitated tank where it is washed to achieve a neutral or near neutral pH. Thereafter the crumb is subjected to additional vibrating screen and drying steps and the like. Variations on this method have been suggested for the coagulation of natural and synthetic elastomers, for example, in commonly owned U.S. Pat. No. 4,029,633 to Hagopian and in U.S. Pat. No. 3,048,559 to Heller. Additional wet masterbatch methods are described in, e.g., U.S. Pat. No. 6,841,606, PCT Publication WO 2006/068078, and PCT Publication WO 2006/080852. As used herein, "wet mixing" or "wet masterbatch" techniques refer to methods in which elastomer latex is combined with particulate filler slurry fluid to produce elastomer composite. The resulting elastomer composite is termed a wet mix composite or wet masterbatch. In contrast, dry mix composites are prepared by dry mixing methods in which dry particulate filler is combined with rubber.

An alternative mixing method is disclosed by commonly owned U.S. Pat. Nos. 6,048,923 and 6,929,783, which disclose a wet masterbatch process in which separate streams of a carbon black slurry and an elastomer latex are combined under conditions where the elastomer latex coagulates without the use of added coagulants. The masterbatch is dewatered to about 15% to 25% water content and then passed through a continuous compounder and, optionally, an open mill. An additional method of dewatering and drying a wet masterbatch to optimize the microdispersion of the resulting elastomer composite is described in US Patent Publication No. US 20110021664.

Desirable properties for filled elastomer composites include high wear resistance, high durability, and low hysteresis. Increased reinforcement of elastomer composites, e.g., through higher filler loadings, can improve durability and wear performance. Unfortunately, hysteresis also increases with filler loading. High hysteresis reduces the automobile mileage and is detrimental to elastomer performance in vibration isolation applications. Low hysteresis is also correlated with low heat buildup.

Mastication of dry masterbatch (e.g., after it is produced by a dry mix process or by a wet masterbatch process, followed by drying) may be employed to reduce Mooney viscosity and improve processability while incorporating additives such as oils, antioxidants, and zinc oxide. Vulcanizing agents may be added as well or may be added in a second mastication step. However, the mixing may need to be done at lower temperatures (e.g., below 125° C.) to prevent precure or scorch. In addition, overmixing may be detrimental to viscoelastic properties and may increase flocculation during storage, which can increase storage hardening and further degrade rubber performance (Wang, et al., K G K Kautschuk Gummi Kunststoffe, Vol. 7-8, 2002, pp. 388-396). Thus, it is desirable to have methods for combining vulcanizing agents with elastomer composites produced by a wet masterbatch method that do not compromise the mechanical properties of the resulting vulcanizate.

For some applications, it is desirable to employ blends of elastomers to optimize the mechanical properties of the masterbatch and/or a vulcanized rubber product of the masterbatch. Blends may be produced by co-coagulating a mixture of elastomer latices (see, e.g., U.S. Pat. No. 4,271, 213) or by recovering a polymer blend from a mixture of an elastomer latex and a solution containing a second polymer (see, e.g., U.S. Pat. No. 5,753,742). Alternatively, blends of elastomers may be produced by dry-mixing two elastomers together. It is known to blend dry mixed elastomer composites with additional elastomer to reduce hysteresis. However, the typical reduction thus obtained is typically less than 10% with respect to the original neat material. Thus, it is additionally desirable to produce elastomer composite with even lower hysteresis but without significantly reducing durability and/or wear performance.

U.S. Pat. No. 7,105,595 B2, to Mabry et al., incorporated herein by reference in its entirety, describes elastomer composite blends prepared by wet/dry mixing methods and apparatus. In the wet mixing step, for instance, elastomer composite is prepared by the wet masterbatch method disclosed in U.S. Pat. No. 6,048,923. The coagulum produced by such wet mixing step, with or without intermediate processing steps, is then mixed with additional elastomer in a dry mixing step, for example, during compounding to form elastomer composite blends. The additional elastomer combined with the coagulum may be the same as or different from the elastomer(s) used in the wet mixing step.

However, additional dry mixing of elastomer composites produced by wet masterbatch techniques introduces all the risks to material properties that were originally averted by avoiding dry mixing of the elastomer. Nonetheless, diluting elastomer composites with additional elastomer presents economic and materials benefits to the manufacturer. By preparing more highly loaded elastomer composite (i.e., with greater amounts of filler), additional elastomer can be blended while maintaining a desirable filler loading level. In addition, where the second elastomer material does not have the same composition as that in the elastomer composite, the advantages of the material properties of both elastomers may be exploited. Finally, even where the second elastomer material has the same composition as the elastomer composite, the difference in properties between the filled and the unfilled elastomer can be exploited. Thus, it is desirable to prepare blends of elastomer composites prepared by wet masterbatch methods that can present the advantages above without losing their advantageous mechanical properties as a result of additional mastication during the blending process.

SUMMARY OF THE INVENTION

We have discovered that elastomer composite materials having superior qualities can be prepared by "diluting" a neat elastomer composite prepared by a suitable wet masterbatch techniques and having a certain filler content, e.g., a loading level of at least 60 phr (parts per hundred rubber by weight), with a second or additional elastomer material, thus generating an elastomer composite blend having a filler content at least 10 phr less than the elastomer composite. It is expected that additional benefits may be recognized through the use of carbon black fillers having an STSA of at least about 120 $m^2/g$.

Generally, the neat elastomer composite prepared by a suitable wet masterbatch technique is combined (blended) with the second elastomer material by mixing, typically dry mixing. Thus the overall process can be thought of and is described herein as a "wet/dry" process. We have also discovered that mixing time and/or mechanical energy requirements for preparing the blend by dry mixing can be kept relatively low without a negative impact on blend quality.

Alternatively or in addition, the elastomer composite materials may be prepared using mixing (i.e., compounding with a curative package) protocols which impart reduced amounts of energy to the material, for example, reduced mixing times or reduced roll milling times. For example, single stage mixing may also be used to further improve hysteresis in both neat elastomer composites and elastomer composite blends. Alternatively or in addition, single stage mixing followed by limited roll milling, e.g., only a minute on the roll mill or simply sheeting the material after mixing, can also provide cost reductions and process streamlining.

In many of the implementations disclosed herein, flexibility is provided as to the choice of elastomer(s) utilized in the fluid (e.g., liquid) or "wet mixing" step and in the choice of elastomer(s) used in the subsequent "dry mixing", or blending, step. In many cases, the same elastomer (or mixture of elastomers) is used in the wet and dry mixing steps. However, different elastomers can be used in any suitable relative weight proportion.

Advantageously, in some of the implementations disclosed here, the hysteresis properties of the elastomer composite blend are maintained or improved with respect to elastomer composites having the same final filler loading but produced without blending. Alternatively or in addition, the reinforcement properties, evidenced by the ratio of the tensile moduli at 300% and 100% strain, are maintained or improved with respect to elastomer composites having the same final filler loading but produced without blending.

Blends produced by practicing the invention may have improved properties relative to blends obtained entirely by conventional dry mixing techniques. They can also have superior properties such as, for example, with respect to hysteresis and reinforcement, when compared to neat elastomer composites produced by the same wet masterbatch technique and having the same loading level as the blend.

The above and other features of the invention including various details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous implementations without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings:

FIG. 5) and modulus ratio (FIG. 6) for a variety of elastomer composite blends mixed according to exemplary implementations of the invention to elastomer composites produced by wet masterbatch methods but without blending.

DETAILED DESCRIPTION OF THE PREFERRED EMBODIMENTS

Figure 1:
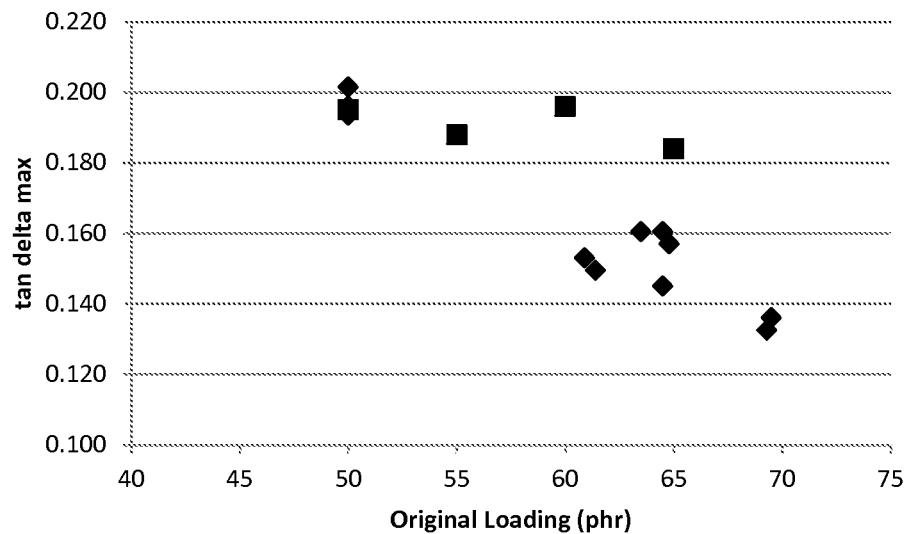
FIGS. 1 and 2 compare tan delta max (measured at 60° C.) and the ratio M300/M100 for a variety of elastomer composite blends mixed according to exemplary implementations of the invention to elastomer composites produced by dry mixing and/or without blending (diamonds—wet masterbatch; squares—dry mix).

The present invention generally relates to elastomer composite blends and methods for producing them. The blends include: an elastomer composite in which a particulate material (filler) is dispersed in a first elastomer; and a second or additional elastomer material. In many cases, the second elastomer material is the same as the first elastomer. However, the second elastomer material also can be an elastomer that is different from the first elastomer. As used herein, the "first elastomer" or "second/additional elastomer material" can each be a single elastomer or a mixture of elastomers. The second elastomer material may include additional ingredients, such as filler or antioxidant. As used herein, the elastomer composite in which particulate filler is disposed in the first elastomer is termed "neat elastomer composite." The mixture of the neat elastomer composite with the second elastomer material is termed "elastomer composite blend". In some implementations, for example, in which reduced amounts of specific energy are employed to mix the elastomer composite with additives in preparation for vulcanization, the benefits described herein may be realized with neat elastomer composite.

In one implementation, a process for producing an elastomeric composition containing a filler includes preparing an elastomer composite comprising natural rubber and a first filler loading of carbonaceous aggregated filler having an STSA of at least 120 m²/g, the first filler loading being greater than 60 phr, by a wet masterbatch method; and blending the elastomer composite with a second elastomer material comprising an elastomer and optional particulate filler to produce an elastomeric composition having a second filler loading, the second filler loading being at least about 10 phr lower than the first filler loading, to produce an elastomer composite blend, wherein M300/M100 of the vulcanized elastomer composite blend is at least 0.5 higher than M300/M100 for an elastomer composite of the same composition but prepared according to CTV Comparative Method 1.

As used herein, CTV Comparative Method 1 means mixing the components of the elastomer composite in a 1600 cc internal mixer according to the procedure in Table A. After each mixing stage, compounds are sheeted for about one minute on a 2-roll mill operated at 50° C. and about 37 rpm with a nip gap sufficient for adequate banding (about 2.4 mm), followed by six end-rolls, with a rest time between stage 1 and stage 2 mixing of at least 3 hours. The material is then vulcanized in a heated press set at 150° C. using a mold with a 2 mm thick spacer for a time determined by a conventional rubber rheometer (i.e., T90+10% of T90, where T90 is the time to achieve 90% vulcanization).

TABLE A

| Stage 1 | |
| --- | --- |
| Fill factor (%) | 70 |
| Rotor speed (rpm) | 80 |
| Start temperature (° C.) | 60 |
| Time rubber addition (s) | 0 |
| Time CB addition (s) | 30 |
| Time smalls addition (s) | 150 |
| Time for sweep (s) | 60, 180 |
| Dump time (s) | 240 |
| Stage 2 | |
| Fill factor (%) | 70 |
| Rotor speed (rpm) | 60 |
| Start temperature (° C.) | 50 |
| Time masterbatch and curatives (s) | 0 |
| Time for sweep | 30 |
| Dump time (s) | 60 |

Generally, the neat elastomer composite is prepared by a wet process and has a first loading level. The first loading level is reduced by mixing the neat elastomer composite with the second or additional elastomer material to form an elastomeric composition (also referred to herein as an "elastomer composite blend") having a loading level that is lower than the first. The blends described herein can be curative-free compositions, curative-bearing compositions, and vulcanized rubber materials and products formed of such compositions. Mechanical properties are measured on vulcanized compositions; thus, following formation of the wet masterbatch and blending with the second elastomer material, the resulting elastomer composite blend is vulcanized to measure tensile and hysteresis properties.

In certain implementations, the invention relates to elastomer composite blends in which the neat elastomer composite contains particulate filler, for example, CB, in an amount of at least about 55 phr, such as, for instance, from about 55 phr to about 100 phr, from about 55 phr to about 60 phr, from about 60 phr to about 65 phr, from about 65 phr to about 70 phr, from about 70 phr to about 75 phr, from about 75 phr to about 85 phr, or from about 85 phr to about 100 phr. One of skill in the art will recognize that the desired carbon black loading will depend on the surface area and structure of the carbon black. For example, the desired loading for a carbon black having a surface area, as measured by STSA, greater than 120 m²/g may be much less than the desired loading for a carbon black having a much lower surface area such as an N774 type (STSA=29 m²/g) carbon black. Blends obtained by mixing neat elastomer composites with the second elastomer material have a final filler loading, e.g., a carbon black loading, of at least about 10 phr less than the loading of the neat elastomer composite; for example, about 10 phr less to about 15 phr less, about 15 phr less to about 20 phr less, about 20 phr less to about 25 phr less, or about 25 phr less to about 30 phr less. For example, a neat elastomer composite with 65 phr of an N134 type carbon black may be diluted, or let down, to a 50 phr elastomer composite blend.

Blending the elastomer composite with a second elastomer material can be carried out by mixing at reduced times and/or with minimal premastication of the neat elastomer composite. In one implementation, one-stage mixing is selected to incorporate all the ingredients of the curative package, including the curatives themselves, in a single mixing step. This may be followed by limited amounts of roll milling.

Certain implementations of the elastomer composite blends, methods and apparatus for producing them are disclosed below. While various preferred implementations of the invention can employ a variety of different fillers and elastomers, certain portions of the following detailed description of method and apparatus aspects of the invention will, in some instances, for convenience, describe elastomer composites comprising natural rubber (NR) and carbon black (CB). It will be within the ability of those skilled in the art, given the benefit of this disclosure, to employ the method and apparatus disclosed here in accordance with the principles of operation discussed here to produce neat elastomer composites and elastomer composite blends comprising a number of alternative or additional elastomers, fillers and other materials.

In specific aspects of the invention, the neat elastomer composite is prepared by a wet masterbatch method as further described below.

The elastomer composite may be produced using any wet masterbatch process, including those discussed below and processes such as those disclosed in, e.g., U.S. Pat. Nos. 5,763,388, 6,048,923, 6,841,606, 6,646,028, 7,101,922, 3,335,200, and 3,403,121, and publications US2009/062428, WO2011/034589, WO2011/034587, and WO2012/037244 and other wet masterbatch processes known to those of skill in the art. In general, an elastomer latex fluid and a particulate slurry fluid are combined, and the elastomer latex is caused to coagulate to form a masterbatch crumb. The masterbatch crumb may be dewatered to form a dewatered coagulum.

Suitable elastomer latex fluids include both natural and synthetic elastomer latices and latex blends. The latex should be appropriate for the wet masterbatch process selected and the intended purpose or application of the final rubber product. It will be within the ability of those skilled in the art to select suitable elastomer latex or a suitable blend of elastomer latices for use in the methods and apparatus disclosed here, given the benefit of this disclosure. Exemplary elastomers include, but are not limited to, rubbers, polymers (e.g., homopolymers, copolymers and/or terpolymers) of 1,3-butadiene, styrene, isoprene, isobutylene, 2,3-dialkyl-1,3-butadiene, where alkyl may be methyl, ethyl, propyl, etc., acrylonitrile, ethylene, propylene and the like. The elastomer may have a glass transition temperature (Tg), as measured by differential scanning calorimetry (DSC), ranging from about −120° C. to about 0° C. Examples include, but are not limited to, styrene-butadiene rubber (SBR), natural rubber and its derivatives such as chlorinated rubber, polybutadiene, polyisoprene, poly(styrene-co-butadiene) and the oil extended derivatives of any of them. Blends of any of the foregoing may also be used. The latex may be in an aqueous carrier liquid. Particular suitable synthetic rubbers include: copolymers of from about 10 to about 70 percent by weight of styrene and from about 90 to about 30 percent by weight of butadiene such as copolymer of 19 parts styrene and 81 parts butadiene, a copolymer of 30 parts styrene and 70 parts butadiene, a copolymer of 43 parts styrene and 57 parts butadiene and a copolymer of 50 parts styrene and 50 parts butadiene; polymers and copolymers of conjugated dienes such as polybutadiene, polyisoprene, polychloroprene, and the like, and copolymers of such conjugated dienes with an ethylenic group-containing monomer copolymerizable therewith such as styrene, methyl styrene, chlorostyrene, acrylonitrile, 2-vinyl-pyridine, 5-methyl-2-vinylpyridine, 5-ethyl-2-vinylpyridine, 2-methyl-5-vinylpyridine, allyl-substituted acrylates, vinyl ketone, methyl isopropenyl ketone, methyl vinyl ether, alphamethylene carboxylic acids and the esters and amides thereof such as acrylic acid and dialkylacrylic acid amide. Also suitable for use herein are copolymers of ethylene and other high alpha olefins such as propylene, 1-butene and 1-pentene. As noted further below, the rubber compositions can contain, in addition to the elastomer and filler, a coupling agent, and optionally, various processing aids, oil extenders and antidegradants Exemplary natural rubber latices include but are not limited to field latex, latex concentrate (produced, for example, by evaporation, centrifugation or creaming), skim latex (e.g., the supernatant remaining after production of latex concentrate by centrifugation) and blends of any two or more of these in any proportion. The latex should be appropriate for the wet masterbatch process selected and the intended purpose or application of the final rubber product. The latex is provided typically in an aqueous carrier liquid. Selection of a suitable latex or blend of latices will be well within the ability of those skilled in the art given the benefit of the present disclosure and the knowledge of selection criteria generally well recognized in the industry.

The natural rubber latex may also be chemically or enzymatically modified in some manner. For example, it may be treated to chemically modify or reduce various non-rubber components, or the rubber molecules themselves may be modified with various monomers or other chemical groups such as chlorine. Exemplary methods of chemically modifying natural rubber latex are disclosed in European Patent Publications Nos. 1489102, 1816144, and 1834980, Japanese Patent Publications Nos. 2006152211, 2006152212, 2006169483, 2006183036, 2006213878, 2006213879, 2007154089, and 2007154095, U.S. Pat. Nos. 6,841,606 and 7,312,271, and U.S. Patent Publication No. 2005-0148723. Other methods known to those of skill in the art may be employed as well.

The particulate filler fluid may include carbonaceous aggregated particulates, for example, carbon black and silicon-coated or silicon treated carbon blacks, or mixtures of two or more of these, in a suitable carrier fluid. When a carbon black filler is used, selection of the carbon black will depend largely upon the intended use of the elastomer composite product. Exemplary carbon blacks include ASTM N100 series-N900 series carbon blacks, for example N100 series carbon blacks, N200 series carbon blacks, N300 series carbon blacks, N700 series carbon blacks, N800 series carbon blacks, or N900 series carbon blacks. Carbon blacks sold under the Regal®, Black Pearls®, Spheron®, Sterling®, and Vulcan® trademarks available from Cabot Corporation, the Raven®, Statex®, Furnex®, and Neotex® trademarks and the CD and HV lines available from Columbian Chemicals, and the Corax®, Durax®, Ecorax®, and Purex® trademarks and the CK line available from Evonik (Degussa) Industries, and other fillers suitable for use in rubber or tire applications, may also be exploited for use with various implementations. Suitable chemically functionalized carbon blacks include those disclosed in WO 96/18688 and US2013/0165560, the disclosures of which are hereby incorporated by reference. Mixtures of any of these carbon blacks may be employed.

Elastomer composites containing carbon blacks having a statistical thickness surface area (STSA, ASTM Standard D6556) of at least about 120 $m^2/g$, for example, from about 120 $m^2/g$ to about 240 $m^2/g$, e.g., from about 120 $m^2/g$ to about 130 $m^2/g$, from about 130 $m^2/g$ to about 140 $m^2/g$, from about 140 $m^2/g$ to about 150 $m^2/g$, from about 150 $m^2/g$ to about 160 $m^2/g$, from about 150 $m^2/g$ to about 160 $m^2/g$, from about 160 $m^2/g$ to about 170 $m^2/g$, from about 170 $m^2/g$ to about 180 $m^2/g$, from about 180 $m^2/g$ to about 190 $m^2/g$, from about 190 $m^2/g$ to about 200 $m^2/g$, from about 200 $m^2/g$ to about 210 $m^2/g$, from about 210 $m^2/g$ to about 220 $m^2/g$, from about 220 $m^2/g$ to about 230 $m^2/g$, or from about 230 $m^2/g$ to about 240 $m^2/g$, may especially benefit from the teachings herein related to the production of elastomer composite blends. Exemplary carbon blacks include ASTM N134 type carbon black and CRX 1346 carbon black available from Cabot Corporation.

Carbon blacks having any of the above surface areas may additionally have a structure, as given by the oil adsorption number for the compressed carbon black (COAN, ASTM D3493), of from about 60 to about 115 mL/100 g, for example, from about 65 to about 75 mL/100 g, from about 75 to about 85 mL/100 g, from about 85 to about 95 mL/100 g, from about 95 to about 105 mL/100 g, or from about 105 to about 115 mL/100 g.

Both silicon-coated and silicon-treated carbon blacks may be employed in various implementations. In silicon-treated carbon black, a silicon containing species such as an oxide or carbide of silicon is distributed through at least a portion of the carbon black aggregate as an intrinsic part of the carbon black. Conventional carbon blacks exist in the form of aggregates, with each aggregate consisting of a single phase, which is carbon. This phase may exist in the form of a graphitic crystallite and/or amorphous carbon, and is usually a mixture of the two forms. Carbon black aggregates may be modified by depositing silicon-containing species, such as silica, on at least a portion of the surface of the carbon black aggregates. The result may be described as silicon-coated carbon blacks.

The materials described herein as silicon-treated carbon blacks are not carbon black aggregates which have been coated or otherwise modified, but actually represent a different kind of aggregate having two phases. One phase is carbon, which will still be present as graphitic crystallite and/or amorphous carbon, while the second phase is silica (and possibly other silicon-containing species). Thus, the silicon-containing species phase of the silicon-treated carbon black is an intrinsic part of the aggregate; it is distributed throughout at least a portion of the aggregate. A variety of silicon-treated blacks are available from Cabot Corporation under the Ecoblack™ name and are described in more detail in U.S. Pat. No. 6,028,137. It will be appreciated that the multiphase aggregates are quite different from the silica-coated carbon blacks mentioned above, which consist of pre-formed, single phase carbon black aggregates having silicon-containing species deposited on their surface. Such carbon blacks may be surface-treated in order to place a silica functionality on the surface of the carbon black aggregate as described in, e.g., U.S. Pat. No. 6,929,783.

As noted above, additives may be used, and in this regard coupling agents useful for coupling silica or carbon black should be expected to be useful with the silicon-treated carbon blacks. Carbon blacks and numerous other suitable particulate fillers are commercially available and are known to those skilled in the art.

One or more additives also may be pre-mixed, if suitable, with the particulate slurry or with the elastomer latex fluid or may be combined with the masterbatch crumb during or after coagulation. Additives also can be mixed into the elastomer masterbatch subsequently, e.g., by dry mixing techniques. Numerous additives are well known to those skilled in the art and include, for example, antioxidants, antiozonants, plasticizers, processing aids (e.g., liquid polymers, oils and the like), resins, flame-retardants, extender oils, lubricants, and a mixture of any of them. Exemplary additives include but are not limited to zinc oxide and stearic acid. The general use and selection of such additives is well known to those skilled in the art.

The particulate filler slurry may be produced according to any technique known to those of skill in the art. In an exemplary method employing carbon black pellets, the pellets are combined with water, and the resulting mixture is passed through a colloid mill, pipeline grinder, or the like to form a dispersion fluid. This fluid is then passed to a homogenizer that more finely disperses the carbon black in the carrier liquid to form the slurry. Exemplary homogenizers include but are not limited to the Microfluidizer® system commercially available from Microfluidics International Corporation (Newton, Mass., USA). Also suitable are homogenizers such as models MS 18, MS45 and MC120 Series homogenizers available from the APV Homogenizer Division of APV Gaulin, Inc. (Wilmington, Mass., USA). Other suitable homogenizers are commercially available and will be apparent to those skilled in the art given the benefit of the present disclosure. The optimal operating pressure across the homogenizer may depend on the actual apparatus, the filler composition and the filler content. In implementations employing carbon black, the homogenizer may be operated at a pressure from about 10 psi to about 5000 psi, for example, about 10 psi to about 1000 psi, about 1000 psi to about 1700 psi, about 1700 psi to about 2200 psi, about 2200 psi to about 2700 psi, about 2700 psi to about 3300 psi, about 3300 psi to about 3800 psi, about 3800 psi to about 4300 psi, or about 4300 psi to about 5000 psi. Depending on the wet masterbatch method employed, a high carbon black content may be used to reduce the task of removing excess water or other carrier. In the wet masterbatch method described below, the slurry may include about 5 to about 30 weight percent carbon black, for example, from about 5 to about 10 weight percent, from about 10 to about 18 weight percent, from about 15 to about 17 weight percent, from about 15 to about 20 weight percent, from about 20 to about 24 weight percent, from about 24 to about 27 weight percent, or from about 27 to about 30 weight percent. Those skilled in the art will recognize, given the benefit of this disclosure, that the carbon black content (in weight percent) of the slurry should be coordinated with other process variables during the wet masterbatch process to achieve a desired carbon black content (in phr) in the ultimate product.

The slurry preferably is used in masterbatch production immediately upon being prepared. Fluid conduits carrying the slurry and any optional holding tanks and the like should establish or maintain conditions which substantially preserve the dispersion of the carbon black in the slurry. That is, substantial reagglomeration or settling out of the particulate filler in the slurry should be prevented or reduced to the extent reasonably practical.

In certain preferred implementations, the elastomer composite is produced using a continuous flow process involving mixture of elastomer latex and particulate filler fluids at turbulence levels and flow control conditions sufficient to achieve coagulation even without use of traditional coagulating agents. Such methods are disclosed, for example, in U.S. Pat. No. 6,048,923 and U.S. Patent Publication No. 2011/00221664, the contents of both of which are incorporated herein by reference. In brief, an exemplary method for preparing masterbatch crumb involves simultaneously feeding a slurry of carbon black or other filler and a natural rubber latex fluid or other suitable elastomer fluid to a mixing zone of a coagulum reactor. A coagulum zone extends from the mixing zone, preferably progressively increasing in cross-sectional area in the downstream direction from an entry end to a discharge end. The slurry is fed to the mixing zone preferably as a continuous, high velocity jet of injected fluid, while the natural rubber latex fluid is fed at relatively low velocity. The high velocity, flow rate and particulate concentration of the filler slurry are sufficient to cause mixture and high shear of the latex fluid, flow turbulence of the mixture within at least an upstream portion of the coagulum zone, and substantially completely coagulate the elastomer latex prior to the discharge end. Substantially complete coagulation can thus be achieved without the need for an acid or salt coagulation agent.

After the substantially complete coagulation of the elastomer latex and particulate fluid, masterbatch crumb in the form of "worms" or globules is formed and discharged from the discharge end of the coagulum reactor as a substantially constant flow concurrently with the on-going feeding of the latex and carbon black slurry streams into the mixing zone of the coagulum reactor. Notably, the plug-type flow and atmospheric or near atmospheric pressure conditions at the discharge end of the coagulum reactor are highly advantageous in facilitating control and collection of the elastomer composite product, such as for immediate or subsequent further processing steps. The masterbatch crumb is created and then formed into a desirable extrudate, for example, having about 70-85% water content. After formulation, the masterbatch crumb is passed to suitable drying and compounding apparatus.

In one implementation, the masterbatch crumb is passed from the coagulum reactor to a de-watering extruder via a simple gravity drop or other suitable apparatus known to those of skill in the art. The dewatering extruder may bring the elastomer composite from, e.g., approximately 70-85% water content, to a desired water content, e.g., approximately 1% to 25% water content, for example, from about 8 to about 25% water content or from about 10 to about 20% water content. The optimal water content may vary with the elastomer employed, the type of filler, and the desired downstream processing procedure. Suitable de-watering extruders are well known and commercially available from, for example, the French Oil Mill Machinery Co. (Piqua, Ohio, USA).

After de-watering, the resulting dewatered coagulum may be dried. In certain implementations, the dewatered coagulum is simply thermally dried. Preferably, the dewatered coagulum is mechanically masticated while drying. For example, the dewatered coagulum may be mechanically worked with one or more of a continuous mixer, an internal mixer, a twin screw extruder, a single screw extruder, or a roll mill. Suitable masticating devices are well known and commercially available, including for example, a Unimix Continuous Mixer and MVX (Mixing, Venting, eXtruding) Machine from Farrel Corporation of Ansonia, Conn., a long continuous mixer from Pomini, Inc., a Pomini Continuous Mixer, twin rotor corotating intermeshing extruders, twin rotor counterrotating non-intermeshing extruders, Banbury mixers, Brabender mixers, intermeshing-type internal mixers, kneading-type internal mixers, continuous compounding extruders, the biaxial milling extruder produced by Kobe Steel, Ltd., and a Kobe Continuous Mixer. Alternative masticating apparatus suitable for use with various implementations of the invention will be familiar to those of skill in the art. Exemplary methods for mechanically masticating dewatered composite are disclosed in U.S. patents and Publications Nos. U.S. Pat. No. 6,929,783 and U.S. Pat. No. 6,841,606, and 20110021664, the contents of all of which are incorporated herein by reference. In one preferred method, the dewatered coagulum is brought to a temperature from about 130° C. to about 190° C., for example, about 140° C. to about 180° C., during mastication as a result of friction, and the water content is reduced to about 0.5% to about 3% to produce a masticated masterbatch, following which the masticated masterbatch is further masticated, for example, on a roll mill, and dried, for example, by being subjected to at least an additional 0.3 MJ/kg, for example, at least 0.7 MJ/kg, of mechanical energy.

The neat elastomer composite prepared by a wet mixing technique (alternately termed a wet masterbatch technique), such as by the method and apparatus described above, can optionally undergo any suitable further processing prior to compounding and/or addition of a second elastomer material to form an elastomer composite blend. For example, the neat elastomer composite may be granulated or otherwise cut into smaller pieces for easier handling.

Following drying and optional additional processing, the neat elastomer composite material is compounded with an additive package, curatives, and, in certain implementations, a second elastomer material in any suitable proportion suitable to the intended use, or application and a targeted CB loading level. We have found that addition of a second elastomer material to a neat elastomer composite that contains at least 60 phr of carbon black to achieve a carbon black loading at least 10 phr less than that of the neat material enables production of an elastomer composite blend having lower hysteresis, as evidenced by tan delta max, measured at 60° C., than a neat elastomer composite having the same composition and/or improved reinforcement, as evidenced by the ratio M300/M100. Tan delta 60° is determined using a dynamic strain sweep between 0.01% and 60% at 10 Hz and 60° C. Tan $\delta_{max}$ is the maximum value of tan δ within this range of strains and is reported interchangeably herein as tan delta max and tan delta 60. M300/M100, also termed "the modulus ratio" herein, is the ratio of the stresses measured according to ASTM Standard D412 at 300% and 100% elongation.

For example, the vulcanized elastomer composite blend may have a tan delta max, measured at 60° C., at least about 12% less, for example, from about 12% to about 15% less, from about 15% to about 20% less, or from 20% to about 25% less, than for a neat elastomer composite having the same composition but produced by dry mixing.

Independently or concurrently, the modulus ratio of the vulcanized elastomer composite blend may be at least about 10% greater, for example, from about 10% to about 12%, from about 12% to about 15%, or from about 15% to about 17% greater than that for a vulcanized neat elastomer composite having the same composition but produced by dry mixing. Alternatively or in addition, the modulus ratio may be at least 0.5 greater, preferably at least about 0.75 greater, most preferably at least about 1 greater, for example, up to about 2.2 greater, up to about 2 greater, up to about 1.75 greater, or up to about 1.5 greater, than the modulus ratio for a vulcanized neat elastomer composite having the same composition and produced by dry mixing methods. For vulcanized elastomer composite blends in which the elastomer in the second elastomer material is a synthetic rubber, the modulus ratio may be greater than or equal to −0.0064 (STSA)+6.39, for example, from −0.0064 (STSA)+6.39 to about 7. For vulcanized elastomer composite blends in which the second elastomer material is natural rubber, the values of tan delta 60 and the modulus ratio may satisfy tan delta 60≤0.04 (modulus ratio)−0.106.

Alternatively or in addition, the use of wet masterbatch blends with low structure fillers can provide improvement in modulus ratio of at least 0.5, for example, from 0.5 to 1.2, with respect to dry mixed elastomer composites with the same composition. The improvement in modulus ratio over dry mixed composites provided by wet masterbatch blends with higher structure carbon blacks may be even greater, for example, at least about 1, for example, from 1 to 2.2. For example, the improvement in modulus ratio provided by the use of wet masterbatch blends with respect to dry mixed composites of the same composition may be greater than (0.017*COAN−0.7), for example, between (0.017*COAN−0.7) and (0.033*COAN−1.12), where COAN is the "compressed" oil adsorption number for the filler in the elastomer composite (or the weight averaged value for mixtures of carbon blacks).

Independently or concurrently, for elastomer composite blends in which the second elastomer material is natural rubber, the vulcanizate of the elastomer composite blend may exhibit either a modulus ratio greater than a vulcanizate of the neat elastomer composite from which the blend was made, or a tan delta 60 less than that of the vulcanized neat elastomer composite.

The ratio M300/M100 (also termed "modulus ratio" herein) provides an indication of the rubber reinforcement. For carbon black-filled vulcanizates, stresses at given elongations reflect, among other things, the effect of filler morphology (particle size and structure) and surface activity, which determines filler-polymer and aggregate-aggregate interaction. The ratio of the stress at 300% elongation to that at 100% elongation, $T_{300}/T_{100}$, provides a useful approach for quantifying the degree of polymer-filler interaction because the factors governing the stresses at different elongations are different. Structure affects the occlusion of rubber in the filler aggregates. Increased occlusion increases the effective filler volume fraction, a description of the extent to which filler actually interacts with the rubber matrix and influences the properties of the rubber matrix composite, and thus the stresses at given elongations for the filled vulcanizate. For two compounds filled with same carbon black, the effects of structure and surface area on stress should be the same. As a result, any difference in stresses at different strains can be attributed to the cross-linking density of the polymer matrix, polymer-filler interaction, and aggregate-aggregate interaction, the last of which leads to filler agglomeration. At low strain, the agglomerates are not broken down, and the rubber trapped in the agglomerates can be treated as filler. This increases the effective volume of the fillers, thus increasing the stress at a given elongation. The filler agglomerates gradually break with increasing strain so that the effect of filler agglomeration on stress at given elongation will decrease and finally disappear at about 100% elongation. On the other hand, at higher elongation, e.g., at 300% elongation, a different mechanism is involved. In the absence of interaggregate association, the interaction between the polymer and filler has a greater influence on the stress. Where the interaction between the polymer and the filler is weak, high strain leads to slippage and deattachment (dewetting) of rubber molecules on the black surface, reducing stress for a given strain. The effect of cross-link density on stress is the about the same at both 100% and 300% strain. As a result, the ratio $T_{300}/T_{100}$ provides a measure of the in-rubber polymer-filler interaction (S. Wolff and M.-J. Wang, *Rubber Chem. Technol.*, 65, 329 (1992)).

To vulcanize elastomer composite material, it is combined with a curative package including a cross-linking agent, any necessary activators and accelerators, anti-oxidant, and additional optional additives such as various processing aids, oil extenders, wax, and additional antidegradants. Where sulfur is used as a cross-linking agent, typical accelerators include zinc oxide and or stearic acid, and typical activators include sulfenamides such as N-tert-butyl-2-benzothiazole sulfenamide (TBBS) and N-cyclohexyl-2-benzothiazole sulfonamide (CBS). Anti-oxidants include N-(1,3-dimethylbutyl)-N'-phenyl-p-phenylenediamine (6PPD) and those listed in WO2012/037244. Other curatives used in rubber processing are peroxides, urethane crosslinkers, metallic oxides, acetoxysilane compounds, and so forth. Additional suitable components for sulfur-based and other cross-linking systems are well known to those of skill in the art.

In a typical compounding method, the ingredients of the curative package, with the exception of the sulfur or other cross-linking agent and accelerator, are combined with the neat elastomer composite in a mixing apparatus (the non-curatives are often collectively termed "smalls"). The most common mixing apparatus is the internal mixer, e.g., the Banbury or Brabender mixer, but other mixers, such as extruders, may also be employed. Thereafter, in a second mixing step, the cross-linking agent, e.g., sulfur, and accelerator (if necessary) (collectively termed curatives) are added. The second mixing step is frequently performed in the same type of apparatus as the first mixing step but may be performed on a different type of mixer or extruder or on a roll mill. One of skill in the art will recognize that, once the curatives have been added, vulcanization will commence once the proper activation conditions for the cross-linking agent are achieved. Thus, where sulfur is used, it is important to maintain the temperature below the cure temperature during mixing.

A second elastomer material blended with the neat elastomer composite can comprise any elastomer or mixture of elastomers suitable to the intended use or application, including those listed above for use in the wet mixing step. The second elastomer material can be one or more elastomers which are the same as or different from the elastomer(s) employed to form the masterbatch. In one implementation, the elastomer latex employed in the wet mixing step as well as the second elastomer material employed in the dry mixing step is natural rubber (NR). In this case, NR forms essentially 100% of the elastomer in the elastomer composite blend.

In many implementations, the second elastomer material(s) is/are essentially pure elastomer. In further cases, the second elastomer material(s) is an elastomer composite with a different loading of the particulate filler. The proportions of the two elastomer composites are preferably selected such that the resulting blend has a filler loading at least 10 phr less than the loading of the more highly loaded neat elastomer composite used to produce the blend.

In one implementation, the wet mixing step employs NR latex, while the second elastomer material is butadiene rubber (BR), styrene-butadiene rubber (SBR), or isoprene rubber (IR). With respect to proportions, BR, IR, or SBR may be present in the elastomer composite blend in an amount from about 5 to about 50% by weight, for example, from about 5% to about 10%, from about 10% to about 20%, from about 20% to about 30%, from about 30% to about 40%, or from about 40% to about 50% of total elastomer in the elastomer composite blend.

Without wishing to be bound by theory, it presently is understood that, at least in certain preferred implementations, the elastomer composite blend produced by the wet/dry method disclosed here is a multi-phase composition. The degree of intermingling of the two phases and the degree to which boundary layers between the two phases are more or less distinct will depend on numerous factors including, for example, the mutual affinity of the first elastomer and the second elastomer material, the level of particulate loading, the choice of particulate filler(s), the relative weight proportion of the first elastomer and the second elastomer material, the effectiveness of the blending of the neat elastomer composite and second elastomer material, etc.

In specific implementations of the invention, the elastomer composite produced by a wet process such as that described above is a CB-NR composite. A blend is prepared by diluting the neat elastomer composite with filled or unfilled NR. Diluted preparations were found to exhibit improved reinforcement when compared to control samples having the same loading level as the blend but for which the neat elastomer composite was prepared by dry mixing. Improvements in both reinforcement and hysteresis performance were also observed with respect to neat elastomer composites prepared by a wet masterbatch technique, but without dilution, and having the same CB loading level as the blend.

We have determined that both neat elastomer composites and blends may benefit from reduced mixing times during the compounding process. That is, less mixing energy may be employed to combine the additives with the elastomer composite than was previously assumed. The resulting vulcanized elastomer composites exhibit improved hysteresis with respect to vulcanized elastomer composites in which the filler, e.g., carbon black, and elastomer have been combined in the same manner and proportions but which were compounded for longer times or with greater specific energy before curing.

Neat elastomer composites for use in elastomer composite blends according to certain implementations described herein will have a filler, e.g., carbon black, loading of at least 60 phr as discussed above, and preferably include a carbon black having an STSA of at least 120 $m^2/g$. However, neat elastomer composites with any filler at a much broader range of loading levels may benefit from the teachings here regarding reduced mixing times during compounding. For example, the loading level of carbon black may be from about 30 phr to about 100 phr, for example, from about 20 to about 30 phr, from about 30 to about 40 phr, from about 40 to about 50 phr, from about 50 to about 60 phr, from about 60 to about 70 phr, from about 70 phr to about 80 phr, from about 80 phr to about 90 phr, or from about 90 phr to about 100 phr.

Compounding the elastomer composite obtained by wet techniques with a curative package and any second elastomer material can be conducted within relatively short time intervals and/or with little mechanical energy input. Variables that may be adjusted to optimize the mixing parameters for a given size mixer include fill factor, coolant temperature, rotor speed, mixing time, and dump temperature, and premastication time (i.e., before the addition of some or all ingredients of the curative package). Premastication of neat elastomer composite before addition of the second elastomer material may be minimized, for example, reduced to about 60 s or less, for example, about 30 s, or even eliminated. Roll milling of neat elastomer composite or elastomer composite blends after mixing with a curative package may be reduced to a minute or less. However, the optimal properties do not necessarily correspond to the shortest mixing time, nor the lowest energy input. Depending on the degree of dilution, affinity of the two elastomers for each other and the mixer type/size, the optimum combination of second phase dispersion and rubber degradation may vary. In some implementations, it may be preferable to mix the second elastomer material with the neat elastomer composite longer than one would have mixed the neat elastomer composite alone in order to achieve the optimum combination of second elastomer material dispersion within the composite without undue polymer degradation. The length, specific energy, or energy intensity of mixing to achieve the optimal combination of second elastomer material dispersion in the elastomer composite blend while minimizing polymer molecular weight degradation may therefore vary with the degree of dilution, mixer type, initial and final filler loadings, etc.

For elastomer composite blends with carbon blacks having a surface area (STSA) less than 140 $m^2/g$, premastication of the neat elastomer composite for 30-60 seconds before addition of the second elastomer material may be especially beneficial. In particular implementations, the premastication occurs in an internal mixer with an fill factor of about 70 to about 85%

In specific implementations, all the ingredients in the curative package and any second elastomer material are added in a single mixing stage. The one- or single-stage process can be conducted at a temperature that is sufficiently low to prevent premature curing or scorching, with vulcanized rubber being formed by heating the resulting compounded elastomer composite or elastomer composite blend. For example, the maximum temperature achieved by the compound during mixing may be less than about 120° C., for example, from about 90° C. to about 95° C., from about 95° C. to about 100° C., from about 100° C. to about 105° C., from about 105° C. to about 110° C., from about 110° C. to about 115° C., or from about 115° C. to about 120° C. In some implementations, the mixing may be performed for the same or shorter time than would ordinarily have been used for the first stage of a two stage mix. In any of these implementations, the fill factor of a batch type mixer (e.g., a Banbury mixer) used for the mixing may be from about 70% to about 85% To maintain the advantages provided by reduced mixing time, processing on a roll mill should also be minimized or even reduced to merely sheeting the material as described above. Such processes may especially benefit elastomer composites and elastomer composite blends produced with natural rubber and carbon blacks having a surface area (STSA) less than 175 $m^2/g$.

The present invention includes the following aspects/embodiments/features in any order and/or in any combination:

1. A process for producing an elastomeric composition containing a filler, the process comprising:
   preparing an elastomer composite comprising natural rubber and a first filler loading of carbonaceous aggregated filler having an STSA of at least 120 m²/g, the first filler loading being greater than 60 phr, by a wet masterbatch method; and
   blending the elastomer composite with a second elastomer material comprising an elastomer and optional particulate filler to produce an elastomeric composition having a second filler loading, the second filler loading being at least about 10 phr lower than the first filler loading, to produce an elastomer composite blend, wherein M300/M100 of the vulcanized elastomer composite blend is at least 0.5 higher than M300/M100 for a vulcanized elastomer composite of the same composition but prepared according to CTV Comparative Method 1.
2. The process of claim 1, wherein the M300/M100 of the vulcanized elastomer composite blend is at least (0.017*COAN−0.7) higher than M300/M100 for a vulcanized elastomer composite of the same composition but prepared according to CTV Comparative Method 1.
3. The process of claim 2, wherein the M300/M100 of the vulcanized elastomer composite blend is from (0.017*COAN−0.7) to (0.033*COAN−1.12) higher than M300/M100 for a vulcanized elastomer composite of the same composition but prepared according to CTV Comparative Method 1.
4. The process of any of claims 1-3, wherein the elastomer in the second elastomer material is natural rubber and the vulcanized elastomer composite blend satisfies tan delta 60≤0.04 (M300/M100)−0.106.
5. The process of any of claims 1-3, wherein the elastomer in the second elastomer material is a synthetic rubber and the vulcanized elastomer composite blend exhibits M300/M100 of at least 0.0064*STSA+6.39.
6. The process of claim 5, wherein the synthetic rubber is styrene-butadiene rubber, butadiene rubber, or isoprene rubber.
7. The process of claim 5 or 6, wherein the vulcanized elastomer composite exhibits M300/M100 of from (0.0064*STSA+6.39) to 7.
8. The process of any of claims 1-7, wherein the carbonaceous aggregated filler comprises carbon black.
9. The process of any of claims 1-8, further comprising vulcanizing the elastomer composite blend.
10. The process of any of claims 1-9, wherein the wet mixing method comprises:
    i) combining a first fluid comprising elastomer latex with a second fluid comprising particulate filler;
    ii) causing the elastomer latex to coagulate, thereby forming masterbatch crumb; and
    iii) drying the masterbatch crumb.
11. The process of claim 10, wherein iii) comprises reducing the water content of the masterbatch crumb thereby forming a dewatered coagulum;
    subjecting the dewatered coagulum to mechanical energy, thereby causing the dewatered coagulum to heat as a result of friction, while allowing the dewatered coagulum to achieve a temperature of about 130° C. to about 190° C., wherein water content is reduced to about 0.5% to about 3% and wherein substantially all of the decrease in water content is accomplished by evaporation, thereby producing a masticated masterbatch; and
    subjecting the masticated masterbatch to at least an additional 0.3 MJ/kg of mechanical energy while further reducing the water content.
12. The process of any of claims 1 to 11, further comprising, before blending, masticating the elastomer composite for 30-60 seconds.
13. The process of claim 12, wherein masticating comprises mixing the elastomer composite in an internal mixer at a fill factor of 70-85% for 30 to about 60 seconds.
14. The process of any of claims 1 to 11, wherein blending further includes adding a cross-linking agent to the elastomer composite, wherein the cross-linking agent and the second elastomer material are mixed with the elastomer composite simultaneously.
15. An elastomeric composition prepared by the process of any of claims 1 to 14.
16. An elastomeric composition comprising carbonaceous aggregated filler, the carbonaceous aggregated filler having a value of COAN and natural rubber, the elastomeric composition, following vulcanization, exhibiting M300/M100 at least (0.017*COAN−0.7) higher than M300/M100 for a vulcanized elastomer composite of the same composition and prepared according to CTV Comparative Method 1, wherein COAN is the oil adsorption number of the compressed filler according to ASTM D3493.
17. The elastomeric composition of claim 16, wherein the elastomeric composition, following vulcanization, exhibits M300/M100 from (0.017*COAN−0.7) to (0.033*COAN−1.12) higher than M300/M100 for a vulcanized elastomer composite of the same composition and prepared according to CTV Comparative Method 1.
18. The elastomeric composition of claim 16 or 17, wherein the elastomeric composition, following vulcanization, satisfies tan delta 60≤0.04 (M300/M100)−0.106
19. The elastomeric composition of any of claims 16-18, wherein the elastomeric composition further comprises a synthetic rubber and, following vulcanization, exhibits M300/M100 of at least 0.0064*STSA+6.39
20. The elastomeric composition of claim 19, wherein the synthetic rubber is styrene-butadiene rubber, butadiene rubber, or isoprene rubber.
21. The elastomeric composition of any of claims 19-20, wherein the elastomeric composition, following vulcanization, exhibits M300/M100 of from (0.0064*STSA+6.39) to 7.
22. A vulcanizate of an elastomer composite blend mixed with a curative package, the elastomer composite blend comprising a mixture of a wet mix elastomer composite and natural rubber, the wet mix elastomer composite comprising a carbonaceous aggregated particulate filler in an amount of X phr and having a ratio M300/M100 of Y, wherein
    the vulcanizate has a filler loading at least 10 phr less than X,
    the wet mix elastomer composite has a filler loading of at least 60,
    the ratio M300/M100 of a vulcanizate of the wet mix elastomer composite employing the curative package is less or equal to Y.
23. The vulcanizate of an elastomer composite blend of claim 22, having a tan delta 60 less than or equal to the value of tan delta 60 for the vulcanizate of the wet mix elastomer composite employing the curative package.
24. A vulcanizate of an elastomer composite blend mixed with a curative package, the elastomer composite blend comprising a mixture of a wet mix elastomer composite and natural rubber, the wet mix elastomer composite comprising a carbonaceous aggregated particulate filler in an amount of X phr and exhibiting tan delta 60 of Z, wherein the vulcanizate has a filler loading at least 10 phr less than X, the wet mix elastomer composite has a filler loading of at least 60, the value of tan delta 60 of a vulcanizate of the wet mix elastomer composite employing the curative package is greater than or equal to Z.

25. The elastomeric composition of any of claims 16-21 or the vulcanizate of any of claims 22-24, wherein the carbonaceous aggregated filler is a carbon black.

26. The elastomeric composition or vulcanizate of claim 25, wherein the carbon black has a surface area (STSA) from 120 to 220 m$^2$/g, for example, from 120 to 180 m$^2$/g.

27. An elastomer composite comprising natural rubber and between about 45 phr and 55 phr ASTM N134 carbon black, the elastomer composite having a tan δmax value measured at 60° C. less than about 0.17, less than about 0.16, or less than about 0.15, for example, from 0.135-0.17.

28. An elastomer composite comprising natural rubber and between about 45 phr and 55 phr CRX 1346 carbon black, the elastomer composite having a tan δmax value measured at 60° C. less than about 0.17, less than about 0.16, or less than about 0.15, for example, from about 0.125-about 0.17.

The invention is further illustrated by the following examples which are not intended to be limiting.

EXAMPLES

Materials and Methods

Unless noted otherwise below, all times are given in seconds.

Wet Masterbatch Methods

Carbon Black Slurry Preparation

Dry carbon black (Cabot Corporation, Boston, Mass.) was mixed with water and ground to form a slurry having a concentration of about 16%. The slurry was fed to a homogenizer at an operating pressure of around 3000 psig such that the slurry was introduced as a jet into the mixing zone of a coagulum reactor as a finely ground carbon black slurry. The carbon black slurry flow rate was adjusted to about 1200-2500 kg/hr to modify final carbon black loading levels and achieve the desired production rate. The actual carbon black loading levels were determined by nitrogen pyrolysis or thermogravimetric analysis (TGA). Specific CB grades and loadings are specified in the Examples below Natural Rubber Latex Delivery Field latex having a dry rubber content of about 27-29% was pumped to a mixing portion of a coagulum reactor configured in similarly to that shown in FIG. 7 of U.S. Pat. No. 6,048,923, the entire contents of which are incorporated herein by reference. The latex flow rate was adjusted between about 1000-2500 kg/h in order to modify final carbon black loading levels.

Carbon Black and Latex Mixing

The carbon black slurry and latex were mixed by entraining the latex into the carbon black slurry in the mixing zone of the coagulum reactor. During the entrainment process, the carbon black was intimately mixed into the latex and the mixture coagulated.

Dewatering

The masterbatch crumb was discharged from the coagulum reactor at a rate between 500 and 1000 kg/hr (dry weight) and dewatered to about 10-20% moisture with a dewatering extruder (The French Oil Machinery Company, Piqua, Ohio). In the extruder, the masterbatch crumb was compressed, and water squeezed from the crumb was ejected through a slotted barrel of the extruder.

Drying

The dewatered coagulum was dropped into a continuous compounder (Farrel Continuous Mixer (FCM), Farrel Corporation) where it was masticated and mixed with 1 phr of antioxidant (6PPD). The moisture content of the masticated masterbatch exiting the FCM was around 1-2% and the temperature was between 140 and 180° C. The product was further masticated and dried on an open mill.

Blending and Curing

The cooled elastomer composite was blended with additional rubber (SMR20 natural rubber (Hokson Rubber, Malaysia) unless otherwise specified) and compounded according to the formulation in Table 1 and the procedure outlined in Table 2. The same process, albeit without additional elastomer, was used to prepare vulcanizates of neat elastomer composites. The amounts of masterbatch and unfilled rubber total varied with the desired final loading. For example, a final loading of 50 PHR requires 151 PHR of masterbatch and unfilled rubber (i.e., 100 phr rubber, 50 phr carbon black, 1 phr antioxidant).

TABLE 1

| Ingredient | Phr |
| --- | --- |
| Masterbatch | Variable |
| Unfilled Rubber | Variable |
| ZnO | 3 |
| Stearic acid | 2.5 |
| 6PPD* (antioxidant) | 1.0 |
| SantoCure CBS** | 1.2 |
| Sulfur | 1.2 |

*N-(1,3-dimethylbutyl)-N'-phenyl-p-phenylenediamine
**N-cyclohexyl-2-benzothiazole sulfenamide

TABLE 2

| | Time (min) | Operation |
| --- | --- | --- |
| Stage 1 | | Farrel BR Banbury mixer (1600 cc), 70% fill factor, 80 rpm, 60° C. |
| | 0 | Add rubber-carbon black masterbatch and second elastomer material (if used) |
| | 1 | Add zinc oxide, stearic acid and 6PPD (collectively, "smalls") |
| | 1.5 | Sweep |
| | 2.5 | Dump |
| | | Roll mill using 6 end rolls, rest at least 3 hours |
| Stage 2 | | Farrel BR Banbury mixer (1600 cc), 70% fill factor, 60 rpm, 60° C. |
| | 0 | Add stage 1 compound, sulfur and accelerator |
| | 0.5 | Sweep |
| | 1 | Dump |
| | | Roll mill for one minute with adequate band. Remove and perform 6 end rolls. Sheet off to required thickness. |

Vulcanization was carried out in a heated press set at 150° C. for a time determined by a conventional rubber rheometer (i.e., T90+10% of T90, where T90 is the time to achieve 90% vulcanization).

Dry Mixed Samples

Dry mix elastomer composites were prepared from SMR 20 natural rubber, synthetic rubber as noted below, and carbon black. These materials were compounded using the formulation in Table 3 and the procedure in Table 4 in a Farrel BR Banbury mixer (1600 cc). After each mixing stage, compounds were sheeted for about one minute on a 2-roll mill operated at 50° C. and about 37 rpm with a nip gap sufficient for adequate banding (about 2.4 mm) using 6 end-rolls, with a rest time between stage 1 and stage 2 mixing of at least 3 hours. Vulcanization was carried out in a heated press set at 150° C. for a time determined by a conventional rubber rheometer (i.e., T90+10% of T90, where T90 is the time to achieve 90% vulcanization).

TABLE 3

| Ingredient | Phr |
| --- | --- |
| Unfilled rubber | 100 |
| Carbon black | variable |
| ZnO | 3 |
| Stearic acid | 2.5 |
| 6PPD* (antioxidant) | 2.0 |
| SantoCure CBS | 1.2 |
| Sulfur | 1.2 |

TABLE 4

| Stage 1 | |
| --- | --- |
| Fill factor (%) | 70 |
| Rotor speed (rpm) | 80 |
| Start temperature (° C.) | 60 |
| Time rubber addition | 0 |
| Time CB addition | 30 |
| Time smalls addition | 150 |
| Time for sweep | 60, 180 |
| Dump time | 240 |
| Stage 2 | |
| Fill factor (%) | 70 |
| Rotor speed (rpm) | 60 |
| Start temperature (° C.) | 50 |
| Time masterbatch and curatives | 0 |
| Time for sweep | 30 |
| Dump time | 60 |

The dry mix elastomer composite blends in Examples 1-3 were prepared by preparing a masterbatch with SMR20 natural rubber, carbon black, and 1 phr of 6PPD antioxidant according to the Stage 1 mixing method outlined in Table 4. This masterbatch was then compounded with additional SMR20 natural rubber according to the formulation in Table 1 and the procedure outlined in Table 2. Vulcanization was carried out in a heated press set at 150° C. for a time determined by a conventional rubber rheometer (i.e., T90+10% of T90, where T90 is the time to achieve 90% vulcanization).

One Stage Mixing

Unless otherwise specified, compounds designated as having been compounded using a one stage mixing procedure were compounded using the formulation in Table 1 and the procedure in Table 5 below.

TABLE 5

| Time | Operation |
| --- | --- |
| | Farrel BR Banbury mixer (1600 cc), 70% fill factor, 80 rpm, 60° C. |
| 0 | Add elastomer composite, smalls, and optional second elastomer material |
| 30 | Sweep |
| Variable | Dump at 115° C. |
| | Roll mill for one minute with adequate band. Remove and perform 6 end rolls. Sheet off to required thickness. |

Properties of Filled Compositions

The tensile properties of vulcanized samples (M300 and M100, elongation at break, tensile strength) were measured according to ASTM standard D-412. The modulus ratio is the ratio of M300/M100, i.e., the ratio of the stress of the material at 300% and 100% strain. Tan delta 60° was determined using a dynamic strain sweep between 0.01% and 60% at 10 Hz and 60° C. Tan $\delta_{max}$ was taken as the maximum value of tan $\delta$ within this range of strains.

Example 1

This example was undertaken to study the effects of blending to achieve a final loading level with respect to an elastomer composite prepared directly to the same loading level.

The elastomer composites and elastomer composite blends listed in Table 6 were prepared with N134 type carbon black according to the procedures disclosed under Wet Masterbatch Methods (two stage mix) and Dry Mixed Samples, except that for examples 1H and 1I, the carbon black slurry was produced by combining carbon black and water to form a slurry with 17.5 wt % CB. The mechanical properties of the resulting vulcanizates are listed in Table 7.

TABLE 6

| Example | Dry mix or Wet Masterbatch | Original Carbon Black loading (phr) | Final Carbon Black loading |
| --- | --- | --- | --- |
| 1A* | Dry | 50 | 50 |
| 1B* | Dry | 65 | 50 |
| 1C | Wet | 50 | 23 |
| 1D | Wet | 50 | 23 |
| 1E | Wet | 50 | 23 |
| 1F* | Wet | 23 | 23 |
| 1G* | Wet | 23 | 23 |
| 1H | Wet | 66 | 50 |
| 1I | Wet | 66 | 50 |
| 1J* | Wet | 55 | 50 |
| 1K* | Wet | 55 | 50 |
| 1L* | Wet | 48.4 | 48.4 |
| 1M* | Wet | 48.4 | 48.4 |

*Comparative Examples

TABLE 7

| Example | Elongation At Break (%) | Tensile Strength (MPa) | M300/ M100 | Tan delta 60 |
| --- | --- | --- | --- | --- |
| 1A* | 513 | 32.37 | 5.58 | 0.195 |
| 1B* | 527 | 32.51 | 5.82 | 0.184 |
| 1C | | | 5.32 | 0.072 |
| 1D | | | 5.42 | 0.070 |
| 1E | 642 | 32.26 | 5.34 | 0.087 |
| 1F* | | | 5.06 | 0.074 |
| 1G* | 658 | 32.34 | 4.84 | 0.091 |
| 1H | 476 | 33.39 | 6.85 | 0.147 |
| 1I | 459 | 31.88 | 6.68 | 0.158 |
| 1J* | 500 | 32.92 | 6.22 | 0.177 |
| 1K* | 548 | 34.01 | 6.40 | 0.154 |
| 1L* | 509 | 31.37 | 6.29 | 0.177 |
| 1M* | 521 | 31.76 | 6.23 | 0.177 |

The results show that the greatest improvement in tan delta 60 (lower is better) is for the 66 phr wet masterbatch diluted by 15 phr to a final loading of 50 phr. Little change is seen for the 50 phr wet masterbatch diluted to 23 phr. However, the improvement in modulus ratio delivered by diluting a dry mix composite is maintained when the wet masterbatch is diluted by at least 10 phr (from 66 to 50 or from 50 to 23).

These results suggest that certain properties of elastomer composites prepared by wet masterbatch methods can be improved by diluting a more highly loaded material during compounding rather than simply manufacturing neat elastomer composite with the target loading.

Example 2

This example was undertaken to study the effects of blending to achieve a final loading level with respect to an elastomer composite prepared directly to the same loading level, but using a lower surface area carbon black than in Example 1.

The elastomer composites and elastomer composite blends listed in Table 8 were prepared with N550 type carbon black according to the procedures described under Wet Masterbatch Methods (two stage mix) and Dry Mixed Samples except for use of the curative package set out in Table 9 below. The mechanical properties of the resulting vulcanizates are listed in Table 10.

TABLE 8

| Example | Dry mix or Wet Masterbatch | Original Carbon Black loading (phr) | Final Carbon Black loading |
|---------|---------------------------|-------------------------------------|----------------------------|
| 2A* | Dry | 55 | 25 |
| 2B* | Dry | 55 | 55 |
| 2C* | Dry | 35 | 35 |
| 2D* | Dry | 25 | 25 |
| 2E  | Wet | 55 | 25 |
| 2F* | Wet | 55 | 55 |
| 2G* | Wet | 35 | 35 |

*Comparative Examples

TABLE 9

| Ingredient | phr |
|------------|-----|
| Oil (Calite RPO) | 5.0 |
| Wax (Sunproof Improved) | 2.0 |
| 6PPD | 1.0 |
| ZnO | 3.5 |
| Stearic Acid | 2.0 |
| CBS | 0.7 |
| Sulfur | 2.5 |

TABLE 10

| Example | Elongation At Break (%) | Tensile Strength (MPa) | M300/ M100 | Tan delta 60 |
|---------|------------------------|------------------------|------------|--------------|
| 2A* | 551 | 30.58 | 5.42 | 0.022 |
| 2B* | 433 | 24.70 | 4.35 | 0.084 |
| 2C* | 518 | 27.07 | 5.00 | 0.044 |
| 2D* | 554 | 30.01 | 5.10 | 0.025 |
| 2E  | 545 | 30.85 | 5.41 | 0.026 |
| 2F* | 390 | 23.28 | 4.57 | 0.094 |
| 2G* | 467 | 26.16 | 5.17 | 0.051 |

The results show that the improvement to tan delta 60 provided by diluting a dry mix composite is maintained when the elastomer composite is produced by wet masterbatch methods and blended with additional elastomer.

Example 3

This example was undertaken to study the effects of the initial loading level of the original elastomer composite on the properties of blends prepared with the same final loading level.

Elastomer composites and elastomer composite blends were prepared with a final loading of 50 phr N134 type carbon black. Examples 3A-3M were prepared as described under Wet Masterbatch Methods (two stage mix). The elastomer composite blends in Examples 3N-3Q were prepared as described under Dry Mixed Samples. The dry mixed blends were mixed for 3 minutes in the first stage; the mixing conditions were otherwise as described in the section "Dry Mixed Samples" above. The original loading of the elastomer composite (before blending) and the mechanical properties of the vulcanized blends (all with 50 phr carbon black) and unblended comparative examples are listed in Table 11.

TABLE 11

| Example | Original CB loading (phr) | Elongation At Break (%) | Tensile Strength (MPa) | M300/ M100 | Tan delta 60 |
|---------|---------------------------|-------------------------|------------------------|------------|--------------|
| 3A  | 63.5 | 442 | 32.28 | 6.85 | 0.161 |
| 3B  | 64.5 | 464 | 32.94 | 6.84 | 0.161 |
| 3C  | 60.9 | 471 | 34.10 | 6.73 | 0.153 |
| 3D  | 61.4 | 464 | 32.45 | 6.70 | 0.150 |
| 3E  | 64.5 | 445 | 33.41 | 6.75 | 0.145 |
| 3F  | 64.8 | 460 | 33.29 | 6.58 | 0.157 |
| 3G  | 69.3 | 428 | 32.00 | 6.79 | 0.133 |
| 3H  | 69.5 | 437 | 31.81 | 6.88 | 0.136 |
| 3I* | 50 | 530 | 31.82 | 6.12 | 0.194 |
| 3J* | 50 | 523 | 32.41 | 6.35 | 0.202 |
| 3K* | 50 | 507 | 32.31 | 6.27 | 0.196 |
| 3L* | 50 | 518 | 32.01 | 6.43 | 0.194 |
| 3M* | 50 | 535 | 32.27 | 6.26 | 0.196 |
| 3N* | 65 | 529 | 33.01 | 5.82 | 0.184 |
| 3O* | 60 | 521 | 32.34 | 5.73 | 0.196 |
| 3P* | 55 | 542 | 33.01 | 5.94 | 0.188 |
| 3Q* | 50 | 504 | 31.76 | 5.52 | 0.195 |

*Comparative Examples

Figure 2:
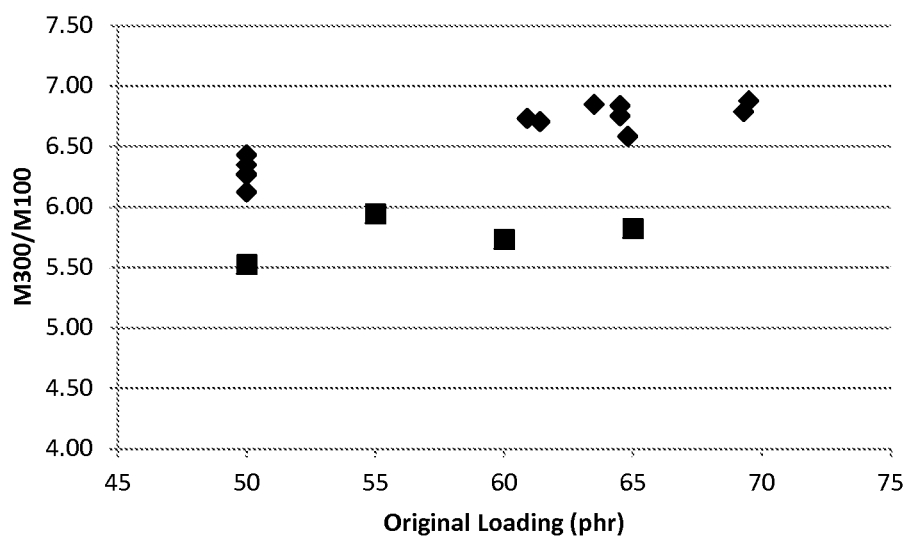

FIGS. 1 and 2 show performance data from Table 11 for 50 phr elastomer composites and elastomer composite blends, plotted with respect to the carbon black loading of the neat elastomer composite before dilution (50 phr composites were not diluted). For elastomer composites prepared by a wet masterbatch method, the results show a clear improvement in tan delta 60 with respect to neat compounds increasing with the original loading of the elastomer composite. The improvement in hysteresis, as measured by tan delta max, is much greater for diluted wet masterbatch materials than that for blends produced by diluting dry mixed composites. The modulus ratio also improves more for wet masterbatch blends than for blends employing dry mixed elastomer composites (FIG. 2). For example, vulcanized elastomer composite blends with N134 carbon black have a modulus ratio that is at least 1 greater than that for dry mixed elastomer composites of the same composition.

These results suggest that certain properties of elastomer composites prepared by wet masterbatch methods can be improved by diluting a more highly loaded material rather than simply manufacturing neat elastomer composite with the target loading.

Figure 3:
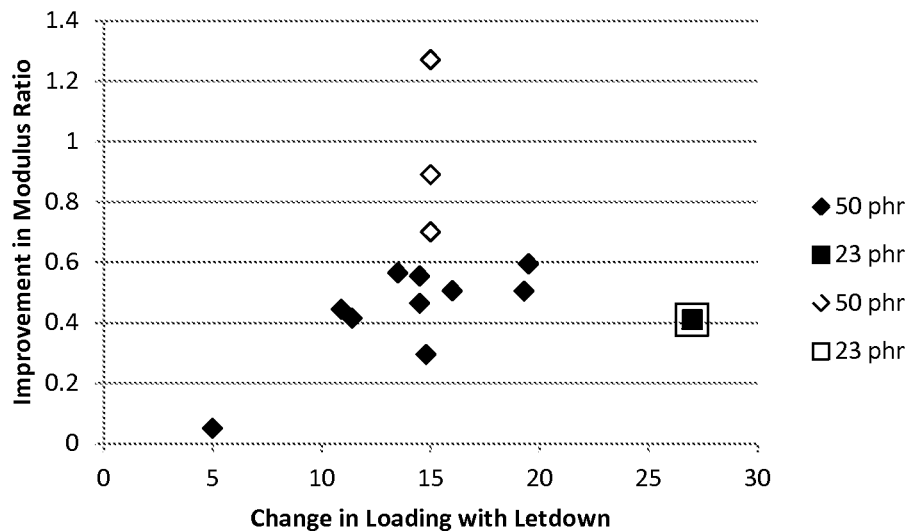
FIGS. 3 and 4 compare the improvement in modulus ratio and tan delta 60 for elastomer composite blends produced with N134 carbon black and natural rubber (diamonds—final loading of 50 phr; squares—final loading of 23 phr; closed symbols—two stage mixing; open symbols—one stage mixing)
Figure 4:
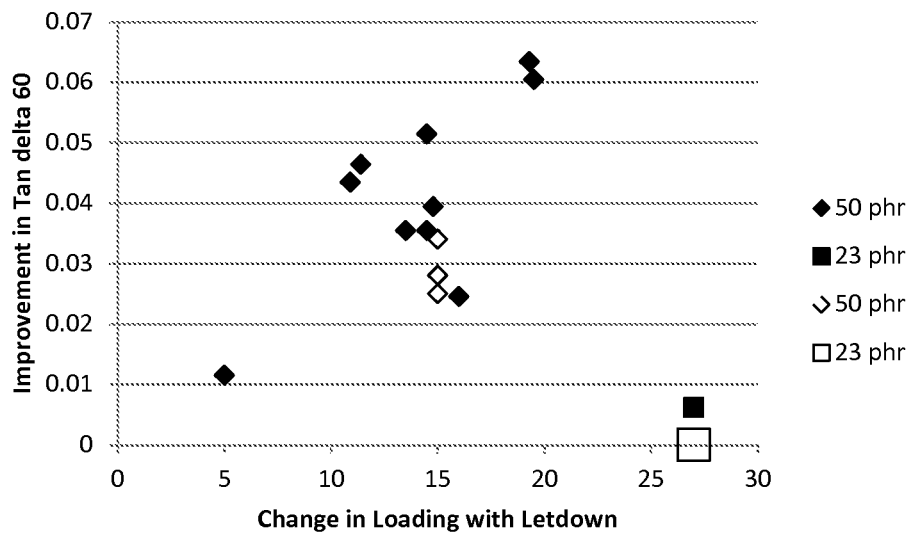

FIGS. 3 and 4 combine the results from Examples 1, 3, and 8-11. The data from Examples 1 and 3 are indicated by the filled symbols. The Figures demonstrate the improvement in tan delta 60 and modulus ratio with blending, plotted against the reduction in carbon black loading as a result of adding the second elastomer material. Diamonds indicate a final loading of 50 phr; squares indicate a final loading of 23 phr. The results show that diluting a neat elastomer composite produced by wet masterbatch methods and having at least 60 phr of carbon black to 50 phr (e.g., change in loading of at least 10 phr and final loading of 50 phr) results in improvements in tan delta 60 and modulus ratio that increase with the amount of dilution. In contrast, the improvement in mechanical performance for 50 phr samples diluted to 23 phr is small.

Example 4

This example was undertaken to study the effects of the initial loading level of the original elastomer composite on the properties of blends prepared with the same final loading level.

Elastomer composites of various loadings and elastomer composite blends with a final loading of 50 phr were prepared with CRX 1346 carbon black (Cabot Corporation, STSA=164 m$^2$/g, oil adsorption number=129 mL/100 g) according to the techniques described under Wet Masterbatch Methods. The original loading of the elastomer composite (before blending) and the mechanical properties of the vulcanized blends (Examples 4A-D, all with a final loading of 50 phr carbon black) are listed in Table 12. Comparative examples 4E-4H, 4J, and 4K are neat elastomer composite that were prepared according to the Wet Masterbatch Methods but without additional elastomer; the final loading is the same as the original loading. Example 4I was produced with 50 phr of CRX 1346 via the methods listed for Dry Mixed Samples. Examples 4L and 4M were produced according to the Wet Masterbatch Methods using the one stage compounding method, but without added elastomer. All other wet masterbatches in this example were mixed using the two stage procedure.

TABLE 12

| Example | Original CB loading (phr) | Elongation At Break (%) | Tensile Strength (MPa) | M300/ M100 | Tan delta 60 |
| --- | --- | --- | --- | --- | --- |
| 4A | 62.2 | 434 | 33.82 | 6.93 | 0.160 |
| 4B | 62.7 | 449 | 32.19 | 7.03 | 0.149 |
| 4C | 65.1 | 430 | 31.62 | 7.58 | 0.136 |
| 4D | 65.2 | 439 | 33.11 | 7.15 | 0.153 |
| 4E* | 62.2 | 368 | 30.72 | 5.94 | 0.209 |
| 4F* | 62.7 | 351 | 28.20 | 6.04 | 0.200 |
| 4G* | 65.1 | 306 | 26.19 | 5.63 | 0.198 |
| 4H* | 65.2 | 335 | 27.36 | 5.74 | 0.224 |
| 4I* | 50 | 488 | 32.26 | 5.51 | 0.188 |
| 4J* | 49.9 | 508 | 35.77 | 6.96 | 0.182 |
| 4K* | 49.9 | 501 | 36.32 | 7.08 | 0.191 |
| 4L | 49.9 | 523 | 37.49 | 7.21 | 0.172 |
| 4M | 49.9 | 491 | 37.89 | 6.86 | 0.162 |

*Comparative example

The results show that increasing the amount of added elastomer increases the modulus ratio of the final compound. Likewise, the magnitude of the improvement in tan delta 60 also increases with the original loading of the elastomer composite before blending. These results suggest that certain properties of elastomer composites prepared by wet masterbatch methods can be improved by diluting a more highly loaded material rather than simply manufacturing neat elastomer composite with the target loading. All elastomer composite blends in this example exhibit a modulus ratio at least 1 greater than that of the corresponding dry mixed elastomer composite.

Example 5

This example was undertaken to study the effects of blending two elastomer composites to form an elastomer composite blend having an intermediate degree of loading.

Elastomer composites of various loadings were prepared with N774 (50 and 25 phr) and N550 (55 and 35 phr) type carbon black. For each grade of carbon black, the elastomer composites having different amounts of carbon black were blended together to form an elastomer composite blend with an intermediate degree of loading (37.5 phr N774 carbon black; 35 phr N550 carbon black). For this example, all of the elastomer composites were prepared by the Wet Masterbatch Methods using the two stage mixing procedure. The loading of the vulcanized elastomer composites and blends and their mechanical properties are listed in Table 13.

TABLE 13

| Example | CB type | Original CB loading (phr) | Elongation At Break (%) | Tensile Strength (MPa) | M300/ M100 | Tan delta 60 |
| --- | --- | --- | --- | --- | --- | --- |
| 5A* | N774 | 50 | 532 | 28.01 | 4.90 | 0.072 |
| 5B* | N774 | 25 | 606 | 30.35 | 4.74 | 0.029 |
| 5C | N774 | 37.5 | 588 | 30.42 | 5.12 | 0.059 |
| 5D* | N550 | 55 | 390 | 23.28 | 4.57 | 0.094 |
| 5E* | N550 | 35 | 467 | 26.16 | 5.17 | 0.051 |
| 5F | N550 | 42 | 596 | 28.30 | 5.75 | 0.081 |

*Comparative (unblended) example

Figure 5:
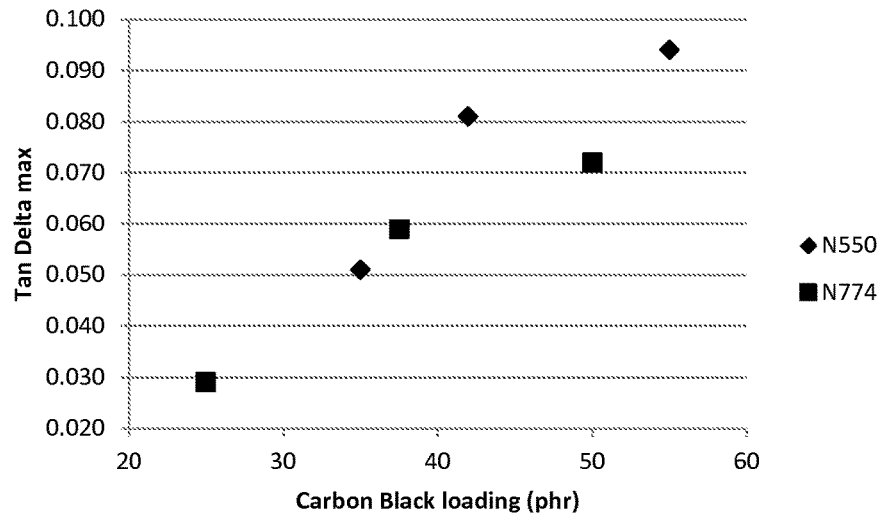
FIGS. 5 and 6 compare tan delta max (measured at 60° C.
Figure 6:
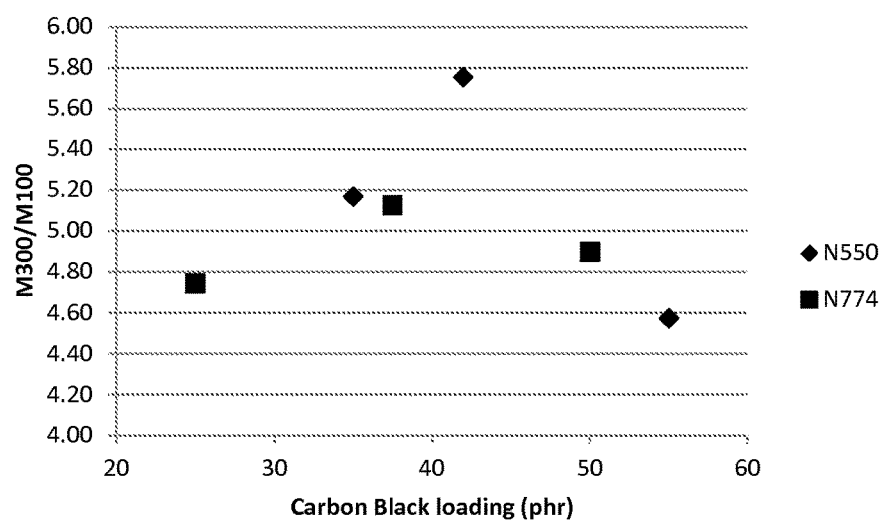

The results for tan delta are shown in FIG. 5, in which the results are plotted with respect to the final loading of the elastomer composite. Assuming that the relationship between tan delta and loading is linear, both blends exhibit an improvement in performance with respect to the predicted performance of neat elastomer composite at the same blending. The result for the higher surface area N550 is more dramatic than for the elastomer composite produced with N774, for which the improvement is barely noticeable. FIG. 6 shows the modulus ratio for the same compounds; in this case, the modulus ratio of the blend is considerably higher than what would be expected for elastomer composite produced by simply manufacturing elastomer composite with the desired amount of carbon black but without blending.

Example 6

This example was undertaken to study the effects of different compounding protocols on the mechanical properties of vulcanized elastomer composites.

Elastomer composites with a final loading of 50 phr were prepared with ASTM N134 type carbon black according to the Wet Masterbatch Methods, except that the compounding procedure from Table 2 was varied as follows: A portion of the samples were compounded in a 2 stage compounding procedure. In the first stage, the fill factor was varied between 65 and 75, the mixer speed was varied between 60 and 100 rpm, and the mixing time was varied between 150 and 360 seconds, with a maximum dump temperature of 150° C. (i.e., if the material reached temperature before the end of the allotted mixing time, mixing was stopped early). Following the first mixing stage, the material was roll milled and mixed in the second stage as described in Table 2.

Following the final mixing stage, the material was roll milled for between 0 (sheeting only) and 5 minutes. A portion of the samples were compounded in a 1 stage compounding procedure. The entire curative package from Table 1, including the curatives, was added to the mixer along with the neat elastomer composite. The fill factor was varied between 70 and 85 and the mixing speed was varied between 60 and 80 rpm. The material was dumped from the mixer after achieving 115° C. regardless of time. Following mixing, the material was roll milled for between 1 and 3 minutes.

Figure 7:
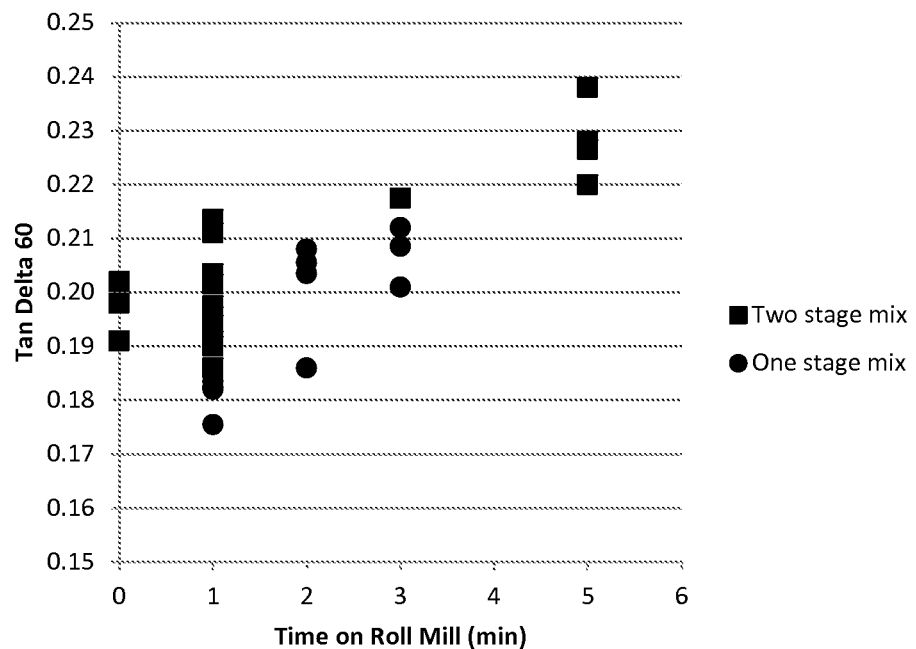
FIGS. 7 and 8 compare tan delta max (measured at 60° C.) and M300/M100 for elastomer composites compounded using different mixing and roll milling protocols.
Figure 8:
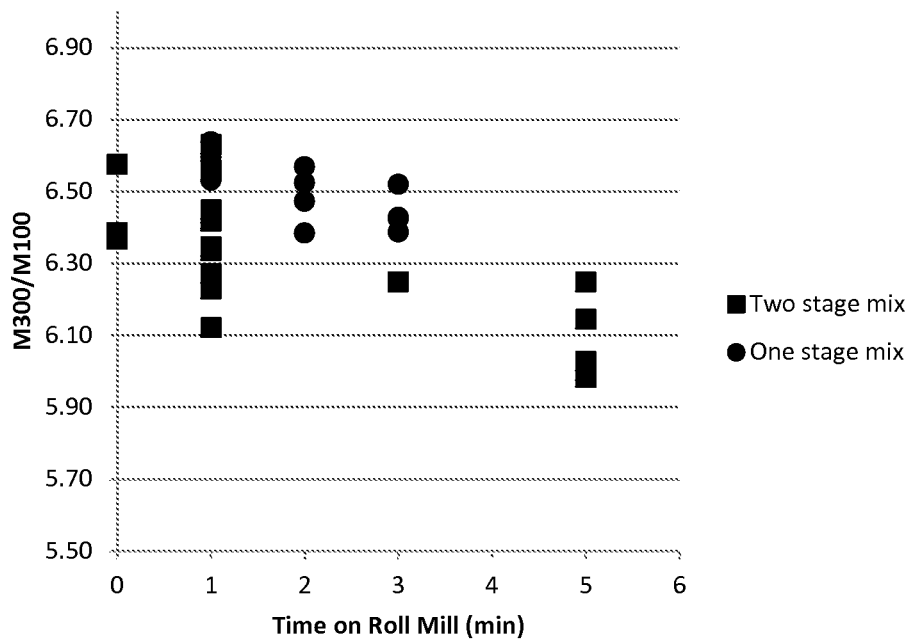

Certain mechanical properties of the various compounds are provided in Table 14. Mechanical properties were not observed to correlate with fill factor. The variation of mechanical properties with roll milling time are shown in FIGS. 7 and 8. The results show that both hysteresis as measured by tan delta max and modulus ratio decrease with additional roll milling. In addition, one stage mixing also provided an improvement in tan delta max, without compromising the modulus ratio at low roll milling times. These results suggest that decreased mixing time is not detrimental to the adequate dispersion of the curative package and can actually benefit the properties of the vulcanized material.

TABLE 14

| Roll mill time (min) | Tan delta 60 | M300/ M100 |
|---|---|---|
| Two Stage Mix | | |
| 1 | 0.204 | 6.23 |
| 1 | 0.190 | 6.63 |
| 1 | 0.211 | 6.45 |
| 1 | 0.214 | 6.42 |
| 1 | 0.198 | 6.55 |
| 5 | 0.227 | 6.00 |
| 5 | 0.220 | 6.03 |
| 3 | 0.218 | 6.25 |
| 5 | 0.228 | 6.14 |
| 5 | 0.238 | 5.98 |
| 5 | 0.220 | 6.25 |
| 1 | 0.194 | 6.12 |
| 1 | 0.202 | 6.35 |
| 1 | 0.196 | 6.27 |
| 0 | 0.191 | 6.57 |
| 1 | 0.191 | 6.33 |
| 0 | 0.202 | 6.38 |
| 1 | 0.186 | 6.44 |
| 0 | 0.198 | 6.37 |
| 1 | 0.190 | 6.42 |
| One Stage Mix | | |
| 1 | 0.182 | 6.60 |
| 2 | 0.186 | 6.38 |
| 3 | 0.201 | 6.39 |
| 1 | 0.176 | 6.53 |
| 2 | 0.206 | 6.52 |
| 3 | 0.212 | 6.43 |
| 1 | 0.183 | 6.58 |
| 2 | 0.208 | 6.57 |
| 3 | 0.209 | 6.42 |
| 1 | 0.184 | 6.64 |
| 2 | 0.204 | 6.47 |
| 3 | 0.212 | 6.52 |

Example 7

This example was undertaken to study the effects of different compounding protocols on the mechanical properties of vulcanized elastomer composite blends.

Figure 9:
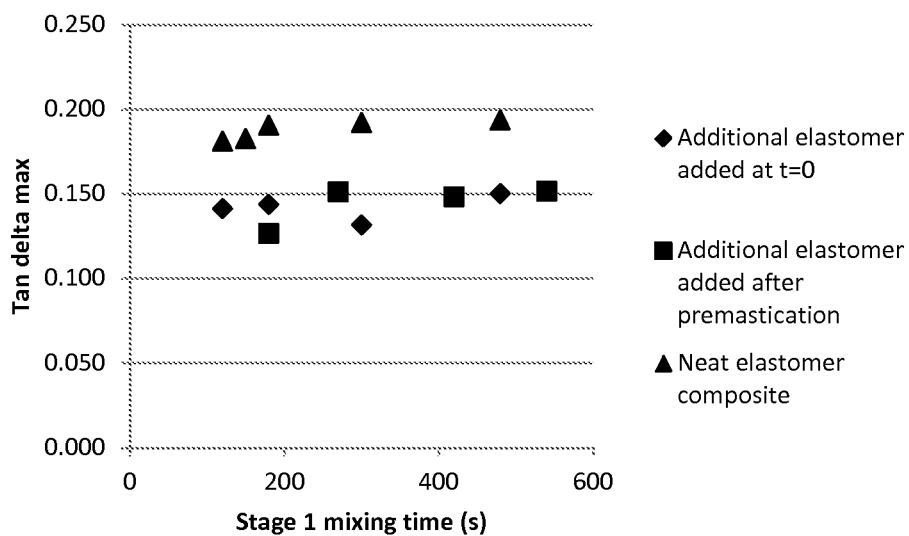
FIGS. 9 and 10 compare tan delta max (measured at 60° C.) and M300/M100 for both neat and blended elastomer composites compounded using different mixing protocols.
Figure 10:
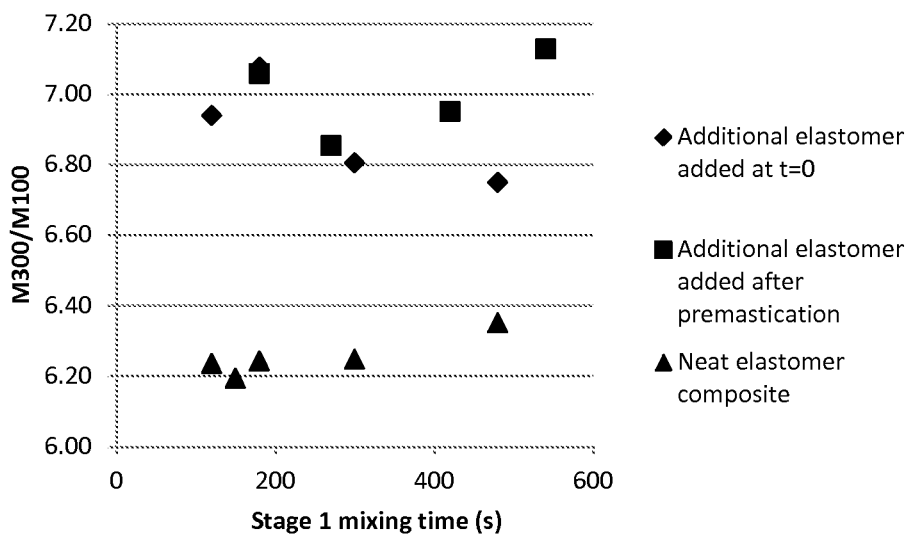

Neat elastomer composites with a loading of 65 phr and 50 phr were prepared with ASTM N134 type carbon black according to the Wet Masterbatch Methods, except the mixing was varied as described below. The 65 phr samples were diluted to produce 50 phr elastomer composite blends (7A-7H). The stage 1 mixing times of both neat (7I-7M) and blended samples and the time at which the additional elastomer was added to produce the blended samples were varied as described in Table 15 to evaluate the effects on mechanical properties. The mechanical properties of the resulting vulcanized elastomer composites and elastomer composite blends (all with a final loading of 50 phr) are shown in Table 15 below. FIGS. 9 and 10 show the results for tan delta max and M300/M100. The graphs show that the best hysteresis, as measured by tan delta max, is obtained for blends which are briefly premasticated before addition of the second elastomer. There appears to be an optimal mixing time (in this Example, 300 seconds in the first stage) for blends which are not premasticated before addition of the second elastomer. An optimum was not observed for the neat elastomer composite.

TABLE 15

| | Tan Delta 60 | M300/ M100 | Tensile strength [Mpa] | Elongation [%] | Stage 1 Time | Blending notes |
|---|---|---|---|---|---|---|
| 7A | 0.141 | 7.04 | 31.48 | 436 | 120 | NR added at 0 s |
| 7B | 0.144 | 6.96 | 32.15 | 437 | 180 | NR added at 0 s |
| 7C | 0.132 | 6.84 | 34.37 | 475 | 300 | NR added at 0 s |
| 7D | 0.150 | 6.73 | 32.23 | 486 | 480 | NR added at 0 s |
| 7E | 0.127 | 7.06 | 33.09 | 465 | 180 | NR added at 30 s, smalls at 60 s |
| 7F | 0.151 | 6.84 | 32.71 | 452 | 270 | NR added at 120 s, smalls at 180 s |
| 7G | 0.148 | 6.89 | 32.31 | 453 | 420 | NR added at 120 s, smalls at 180 s |
| 7H | 0.152 | 7.18 | 34.14 | 472 | 540 | NR added at 240 s, smalls at 300 s |
| 7I | 0.181 | 6.34 | 34.17 | 510 | 120 | N/A |
| 7J | 0.183 | 6.16 | 33.91 | 514 | 150 | N/A |
| 7K | 0.191 | 6.19 | 34.35 | 507 | 180 | N/A |
| 7L | 0.192 | 6.17 | 33.73 | 502 | 300 | N/A |
| 7M | 0.194 | 6.22 | 33.03 | 511 | 480 | N/A |

Example 8

This example was undertaken to study the effects of single stage compounding protocols on the mechanical properties of vulcanized elastomer composite blends.

Neat elastomer composite with a loading of 65 phr was prepared with ASTM N134 type carbon black according to the Wet Masterbatch Methods, using the one stage mixing protocol to dilute the neat elastomer composite to 50 phr (8A), except that the mixing was conducted to achieve a dump temperature of 115° C., corresponding to about two minutes. Neat elastomer composite containing 50 phr of ASTM N134 type carbon black was also prepared according to the Wet Masterbatch Methods and compounded using the one stage mixing protocol except that mixing was again conducted to achieve a dump temperature of 115° C., corresponding to about two minutes (8B). Mechanical properties for the resulting vulcanizates are shown below in Table 16 and are compared to composites from Example 7 that were mixed for similar times.

TABLE 16

| | Blend or Neat? | Tan Delta 60 | M300/M100 | Tensile strength [Mpa] | Elongation [%] | Stage 1 Time [s] |
|---|---|---|---|---|---|---|
| 7A | Blend | 0.141 | 7.04 | 31.48 | 436 | 120 |
| 7C | Blend | 0.132 | 6.84 | 34.37 | 475 | 300 |
| 8A | Blend | 0.131 | 7.00 | 29.25 | 423 | 120 |
| 7I | Neat | 0.181 | 6.34 | 34.17 | 510 | 120 |
| 8B | Neat | 0.165 | 6.09 | 32.88 | 473 | 120 |

The results show that single stage blending results in reduced tan delta max with respect to vulcanizates produced from wet masterbatch composites and compounded using a two stage procedure.

Example 9

This example was undertaken to study the effects of single stage compounding protocols on the mechanical properties of vulcanized elastomer composite blends.

Neat elastomer composite with a loading of 65 phr was prepared with ASTM N134 type carbon black according to the Wet Masterbatch Methods and diluted to 50 phr using the one stage mixing protocol to form an elastomer composite blend (Example 9A). The mechanical properties are compared to the indicated samples from Example 3, in which neat elastomer composites and elastomer composite blend were prepared using the two stage mixing protocol (Table 17).

TABLE 17

| Example | Blend or Neat? | Tan Delta 60 | M300/M100 | Tensile strength [Mpa] | Elongation [%] |
|---|---|---|---|---|---|
| 3F | Blend | 0.157 | 6.58 | 33.29 | 460 |
| 9A | Blend | 0.140 | 6.81 | 30.02 | 438 |
| 3I | Neat | 0.194 | 6.12 | 31.82 | 530 |
| 3J | Neat | 0.202 | 6.35 | 32.41 | 523 |
| 3K | Neat | 0.196 | 6.27 | 32.31 | 507 |

The results show that single stage blending an elastomer composite produced using a wet masterbatch process produces an elastomer composite blend with decreased hysteresis, as measured by tan delta max, as compared to an elastomer composite blend compounded by two stage mixing procedure and can also increase the ratio of M300/M100.

Example 10

This example was undertaken to study the effects of single stage compounding protocols on the mechanical properties of vulcanized elastomer composite blends.

Neat elastomer composite with a loading of 50 and 23 phr was prepared with ASTM N134 type carbon black according to the Wet Masterbatch Methods. The 50 phr material was diluted to 23 phr using the one stage mixing protocol to form an elastomer composite blend (10B). The 23 phr material was also compounded using the one stage mixing protocol (10A). The results are compared to samples from Example 1 in which neat elastomer composite and elastomer composite blend were prepared using a two stage protocol (Table 18).

TABLE 18

| Example | Blend or Neat? | Tan Delta 60 | M300/M100 |
|---|---|---|---|
| 1F | Neat | 0.074 | 5.06 |
| 10A | Neat | 0.069 | 4.85 |
| 1C | Blend | 0.072 | 5.32 |
| 1D | Blend | 0.070 | 5.42 |
| 10B | Blend | 0.069 | 5.26 |

The results show that single stage mixing of both neat elastomer composite and elastomer composite blends reduces hysteresis, as measured by tan delta max, as compared with materials produced using two stage mixing protocols. While single stage mixing of the elastomer composite blend is less beneficial for the ratio M300/M100 when compared to two stage mixing of elastomer composite blend, the elastomer composite blends still improved the modulus ratio relative to dry mixed elastomer composites of the same composition by at least 1.

Example 11

This example was undertaken to study the effects of single stage compounding protocols on the mechanical properties of vulcanized elastomer composite blends.

Neat elastomer composite with a loading of 65 phr was prepared with ASTM N134 type carbon black according to the Wet Masterbatch Methods and diluted with NR to 50 phr carbon black using the one stage mixing protocol to form an elastomer composite blend (Example 11A). The results (Table 19) are compared to elastomer composite blend from Example 4 produced from the same neat elastomer composite but produced using the two stage mixing protocol.

TABLE 19

| Example | Elongation At Break (%) | Tensile Strength (MPa) | M300/M100 | Tan delta 60 |
|---|---|---|---|---|
| 4C | 430 | 31.62 | 7.58 | 0.136 |
| 11A | 409 | 30.02 | 7.38 | 0.137 |

FIGS. 3 and 4 illustrate the improvement provided by different amounts of dilution. The open symbols represent samples produced using single stage mixing techniques in Examples 8-11 and show the difference in performance between blended and unblended samples. While there is a great deal of variation in the samples diluted from 65 phr (i.e., change in loading of 15 phr), the samples diluted from 50 to 23 phr carbon black do not exhibit much improvement with respect to undiluted samples.

Example 12

This comparative example was undertaken to study the effects of blending elastomer composite incorporating N234 carbon black with oil and butadiene rubber.

Neat elastomer composites with carbon black loadings of 65 (Examples 12A, B, E) and 69.3 phr (Examples 12 C, D, F) were prepared with N234 carbon black according to the Wet Masterbatch Methods except that butadiene rubber (CB 24 butadiene rubber, Lanxess) was used as the second elastomer material. Sufficient butadiene rubber was added to achieve a final carbon black loading of 50 phr. The two stage mixing protocol was used with the following changes: 1) 5 phr of Sundex 790 oil was added along with the zinc oxide, stearic acid, and 6PPD (see Table 2); 2) for Examples 12E and 12F, the rubber-carbon black masterbatch was premasticated for 240 seconds prior to the addition of the additional elastomer, the remaining components (ZnO, etc.) for the Stage 1 mix were added at 420 s (e.g., 180 seconds after addition of the additional elastomer), and the material was dumped after a total mixing time of 540 s. The properties of the resulting vulcanizates (all with 50 phr carbon black) are provided in Table 20. Shore A Hardness was measured according to ASTM Standard D2240.

TABLE 20

| Comparative Example | Elongation At Break (%) | Tensile Strength (MPa) | M300/ M100 | Tan delta 60 | Hardness (Shore A) |
|---|---|---|---|---|---|
| 12A | 471 | 27.78 | 6.35 | 0.158 | 60.1 |
| 12B | 472 | 27.71 | 6.19 | 0.147 | 59.9 |
| 12C | 476 | 26.94 | 6.13 | 0.156 | 61.9 |
| 12D | 473 | 27.28 | 6.12 | 0.150 | 61.0 |
| 12E | 4455 | 27.11 | 6.13 | 0.150 | 59.9 |
| 12F | 466 | 27.02 | 6.20 | 0.151 | 61.5 |

Example 13

This example was undertaken to study the effects of different compounding protocols on the mechanical properties of vulcanized elastomer composite blends.

Neat elastomer composites with a carbon black loading of 65 (starting material for Examples 13A-D) and 69 phr (starting material for Examples 13E-H) were prepared with ASTM N234 type carbon black according to the Wet Masterbatch Methods. The samples were diluted to produce 50 phr elastomer composite blends (13A-13H), except that the stage 1 mixing times and the time at which the second elastomer material was added to produce the blended samples were varied as described in Table 21. Comparative examples 13I-N are neat elastomer composites containing about 50 phr of ASTM N234 type carbon black. The mechanical properties of the resulting vulcanized elastomer composites and elastomer composite blends (all with a final loading of 50 phr) are shown in Table 21 below. The results show that hysteresis (tan delta) and modulus ratio are better for blended samples than for unblended samples having the same loading. Variation in the mixing times does not correlate with a substantial change in tan delta. Variation in the mixing time of blends with the 65 phr starting material did not result in dramatic changes in modulus ratio. Variation in the mixing times of blends using the 69 phr starting material produced mixed results.

TABLE 21

| Example | Tan Delta 60 | M300/ M100 | Tensile strength [Mpa] | Elongation at break [%] | Stage 1 Time [s] | Blending notes |
|---|---|---|---|---|---|---|
| 13A | 0.151 | 6.68 | 31.50 | 459 | 120 | NR added at 0 s |
| 13B | 0.142 | 6.56 | 31.07 | 448 | 150 | Standard mix |
| 13C | 0.151 | 6.60 | 31.68 | 451 | 180 | NR added at 30 s, smalls at 60 s |
| 13D | 0.143 | 6.66 | 31.67 | 461 | 300 | NR added at 0 s |
| 13E | 0.148 | 6.87 | 32.06 | 474 | 120 | NR added at 0 s |
| 13F | 0.155 | 6.69 | 32.89 | 478 | 150 | Standard mix |
| 13G | 0.146 | 6.57 | 32.10 | 471 | 180 | NR added at 30 s, smalls at 60 s |
| 13H | 0.143 | 6.85 | 32.63 | 470 | 300 | NR added at 0 s |
| 13I* | 0.166 | 5.82 | 29.50 | 522 | 150 | Standard mix |
| 13J* | 0.174 | 6.16 | 28.41 | 536 | 150 | Standard mix |
| 13K* | 0.170 | 6.04 | 30.48 | 524 | 150 | Standard mix |
| 13L* | 0.158 | 6.33 | 21.31 | 512 | 150 | Standard mix |
| 13M* | 0.170 | 6.25 | 31.73 | 532 | 150 | Standard mix |
| 13N* | 0.170 | 6.03 | 31.90 | 525 | 150 | Standard mix |

*Comparative Examples
Standard Mix - using the curative package and mixing protocol of Tables 1 and 2

Example 14

This example was undertaken to study the effects of the loading level of the original elastomer composite on the properties of vulcanized elastomer composite blends prepared with the same final filler loading level.

Elastomer composites and elastomer composite blends were prepared with a final loading of 50 phr N234 type carbon black according to the Wet Masterbatch Methods. The original loading of the elastomer composite (before blending) and the mechanical properties of the vulcanized blends (all with 50 phr carbon black) and unblended comparative examples (Original loading=Final loading) are listed in Table 22. The data for unblended Comparative Examples 13I-N are reproduced below for comparison. Comparative Examples 14C and D were produced by dry mixing N234 type carbon black with natural rubber as described under Dry Mixed Samples. The data below show that the improvement in modulus ratio and in tan delta 60 do not correlate with the degree of dilution.

TABLE 22

| Example | Original CB loading (phr) | Elongation At Break (%) | Tensile Strength (MPa) | M300/ M100 | Tan delta 60 |
|---|---|---|---|---|---|
| 14A | 69.3 | 475 | 33.02 | 6.59 | 0.142 |
| 13F | 69 | 478 | 32.89 | 6.69 | 0.155 |
| 13B | 65 | 448 | 31.07 | 6.56 | 0.142 |
| 14B | 63.3 | 490 | 32.21 | 6.73 | 0.152 |
| 13I* | 49.8 | 522 | 29.50 | 5.82 | 0.166 |
| 13J* | 49.9 | 536 | 28.41 | 6.16 | 0.174 |
| 13K* | 50.3 | 524 | 30.48 | 6.04 | 0.170 |
| 13L* | 50.2 | 512 | 21.31 | 6.33 | 0.158 |
| 13M* | 49.7 | 532 | 31.73 | 6.25 | 0.170 |
| 13N* | 49.7 | 525 | 31.90 | 6.03 | 0.170 |
| 14C* | 50 | 517 | 30.73 | 5.49 | 0.188 |
| 14D* | 50 | 524 | 61.64 | 5.55 | 0.190 |

Example 15

This example was undertaken to study the effects of single stage compounding protocols on the mechanical properties of vulcanized elastomer composite blends.

Neat elastomer composite with a carbon black loading of 65 (15A) and 69 (15B) phr was prepared with ASTM N234 type carbon black according to the Wet Masterbatch Methods and diluted to 50 phr using the one stage mixing protocol to form an elastomer composite blend. Mechanical properties for the resulting vulcanizates are shown below in Table 23 and are compared to elastomer composite blends (final loading=50 phr) from Example 13 that were prepared by blending neat elastomer composite with the same initial loading but using a two stage mixing procedure; results for unblended elastomer composites (original loading=final loading) from Example 13 are also shown below for comparison.

TABLE 23

| Example | Original CB Loading (phr) | Tan Delta 60 | M300/ M100 | Tensile strength [Mpa] | Elongation [%] |
|---|---|---|---|---|---|
| 15A | 65 | 0.138 | 6.91 | 30.91 | 465 |
| 13B | 65 | 0.142 | 6.56 | 31.07 | 448 |
| 15B | 69 | 0.131 | 6.95 | 28.13 | 417 |
| 13F | 69 | 0.155 | 6.69 | 32.89 | 478 |
| 13I* | 49.8 | 0.166 | 5.82 | 29.50 | 522 |
| 13J* | 49.9 | 0.174 | 6.16 | 28.41 | 536 |
| 13K* | 50.3 | 0.170 | 6.04 | 30.48 | 524 |
| 13L* | 50.2 | 0.158 | 6.33 | 21.31 | 512 |
| 13M* | 49.7 | 0.170 | 6.25 | 31.73 | 532 |
| 13N* | 49.7 | 0.170 | 6.03 | 31.90 | 525 |

*Comparative Example

The results show that single stage blending results in reduced tan delta max and increased modulus ratio with respect to both blended and unblended vulcanizates produced from wet masterbatch composites and compounded using a two stage procedure.

Figure 11A:
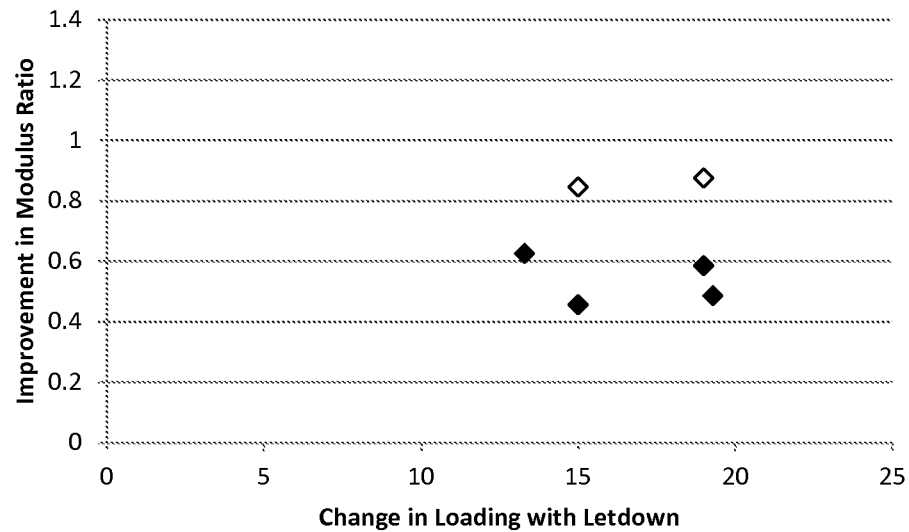
FIG. 11 compares the improvement in modulus ratio (FIG. 11A) and tan delta max (FIG. 11B) (measured at 60° C.) elastomer composite blends produced with N234 carbon black and natural rubber (open symbols—one stage mixing; closed symbols—two stage mixing).
Figure 11B:
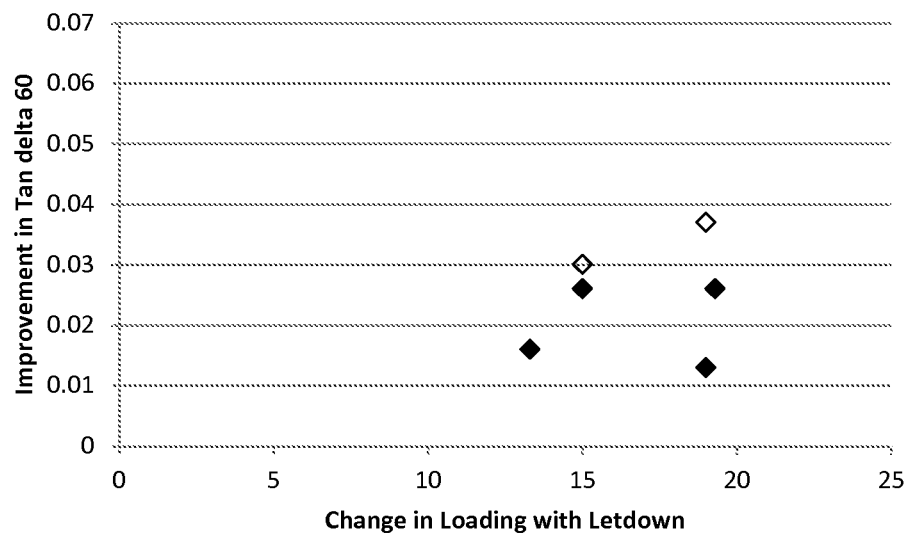

FIG. 11 illustrates the improvement in modulus ratio and tan delta 60 (i.e., the difference in performance between blended and unblended samples) as a function of the amount of dilution (provided as the change in carbon black loading as a result of dilution) using data listed in Examples 14 and 15. The charts show that while one stage mixing provides a greater improvement in performance than two stage mixing, increasing the amount of dilution does not increase the magnitude of the improvement.

Examples 16-19

The following examples demonstrate the blending of natural rubber masterbatch with synthetic rubber.

Neat elastomer composites of various loadings were prepared with various carbon blacks and natural rubber according to the Wet Masterbatch Methods. Instead of dilution with SMR20 natural rubber, the neat elastomer composites were then blended with synthetic rubber using the two stage mixing procedure to form elastomer composite blends with a final carbon black loading of 50 phr. The synthetic rubbers are listed in Table 24 below. In addition, dry mixed elastomer composite blends with 50 phr carbon black were prepared as described under Dry Mixed Samples, except that appropriate amounts of the synthetic rubber were included in the blend to match the amount of synthetic rubber in the blended wet masterbatch samples. For dry mixed samples, all the rubber (both synthetic and natural) were added to the mixer at the same time.

TABLE 24

| Brand name | Rubber Type | Source |
|---|---|---|
| CB24 | Butadiene Rubber (BR) | Lanxess |
| Buna VSL 4526-0HM | Solution Styrene Butadiene Rubber (SBR) | Lanxess |
| SKI-2 | Synthetic Isoprene (IR) | OAO Nizhnekamskneftekhim |

Example 16

This example demonstrates the preparation of elastomer composite blends including ASTM N134 type carbon black and butadiene rubber. Wet masterbatch samples were prepared and blended using the two stage method described under Wet Masterbatch Methods. Dry mixed examples 16B and 16C include 21 phr BR and Example 16E includes 28 phr BR to match the amount of BR used to dilute Examples 16A and B and Example 16D and F, respectively. The specific blends (all with 50 phr carbon black), including the initial carbon black loading, mixing method, and mechanical properties, are listed in Table 25. The use of the elastomer composite blend improved modulus ratio with respect to the dry mixed samples by about 0.5 to almost 1.5. The data show that increasing the amount of dilution decreases the modulus ratio but does not change tan delta 60 dramatically.

TABLE 25

| Example | Original CB loading (phr) | Mixing method | Elongation At Break (%) | Tensile Strength (MPa) | M300/ M100 | Tan delta 60 |
|---|---|---|---|---|---|---|
| 16A | 63.1 | 2 stage | 463 | 29.82 | 6.24 | 0.158 |
| 16B* | 50 | Dry mix | 537 | 30.76 | 5.00 | 0.188 |
| 16C* | 50 | Dry mix | 515 | 31.12 | 5.09 | 0.183 |
| 16D | 69.5 | 2 stage | 393 | 25.32 | 5.60 | 0.149 |
| 16E* | 50 | Dry mix | 523 | 30.08 | 4.94 | 0.185 |

Example 17

This example demonstrates the preparation of elastomer composite blends including CRX 1346 carbon black and butadiene rubber. Wet masterbatch samples were blended using the two stage method described under Wet Masterbatch Methods. Dry mixed samples include 50 phr of carbon black and 23 phr BR to match the amount of BR in the wet masterbatch blends. The specific wet masterbatch blends (all with 50 phr carbon black), including the initial carbon black loading, mixing method, and mechanical properties, are listed in Table 26. The use of a wet masterbatch as a starting material provided dramatic improvement with respect to dry mixed materials, including an improvement to modulus ratio of around 1.5.

TABLE 26

| Example | Original CB loading (phr) | Mixing method | Elongation At Break (%) | Tensile Strength (MPa) | M300/ M100 | Tan delta 60 |
|---|---|---|---|---|---|---|
| 17A | 65.1 | 2 stage | 401 | 27.87 | 6.25 | 0.150 |
| 17B | 65.1 | 2 stage | 430 | 28.65 | 6.40 | 0.158 |
| 17C* | 50 | Dry mix | 474 | 31.21 | 4.67 | 0.155 |
| 17D* | 50 | Dry mix | 518 | 31.79 | 4.83 | 0.168 |

Example 18

This example demonstrates the preparation of elastomer composite blends including ASTM N234 type carbon black and butadiene rubber. Wet masterbatch samples were blended using the two stage methods described under Wet Masterbatch Methods. Dry mixed examples 18B and 16D include 50 phr of carbon black and 23 phr BR and 28 phr BR, respectively, to match the amount of BR used to dilute Examples 18A and C, respectively. Examples 18 E and F were produced with neat natural rubber. The specific wet masterbatch blends (all with 50 phr carbon black), including the initial carbon black loading, mixing method, and mechanical properties, are listed in Table 27. The use of a wet masterbatch to produce natural rubber/synthetic blends results in dramatic improvements with respect to dry mixed elastomer composites. Increasing the degree of dilution did not change hysteresis properties and may negatively impact modulus ratio.

TABLE 27

| Example | Original CB loading (phr) | Mixing method | Elongation At Break (%) | Tensile Strength (MPa) | M300/ M100 | Tan delta 60 |
|---|---|---|---|---|---|---|
| 18A | 65 | 2 stage | 437 | 28.98 | 6.27 | 0.152 |
| 18B* | 50 | Dry mix | 518 | 29.49 | 5.09 | 0.169 |
| 18C | 69.3 | 2 stage | 457 | 29.30 | 6.04 | 0.152 |
| 18D* | 50 | Dry Mix | 539 | 30.02 | 5.13 | 0.174 |

Example 19

This example demonstrates the preparation of elastomer composite blends including ASTM N134 type carbon black and either styrene butadiene rubber (19A-19D) or isoprene rubber (19E). Wet masterbatch samples were blended using the two stage method described under Wet Masterbatch Methods. Dry mixed samples include 23 phr SBR to match the amount of SBR in the wet masterbatch SBR blends. The specific blends, including the initial carbon black loading, mixing method, and mechanical properties, are listed in Table 28. All compounds have a final carbon black loading of 50 phr. The use of a wet masterbatch to produce natural rubber/synthetic blends results in dramatic improvements with respect to dry mixed elastomer composites. The improvement for the SBR blends are similar to the improvement (a little over 1) provided by wet masterbatch methods for BR blends. Example 3A is included for comparison as isoprene rubber has a similar chemical composition to the polymer component of natural rubber. The decrease in modulus ratio between Example 3A and Example 19E is typical for comparisons of synthetic to natural rubber.

TABLE 28

| Example | Original CB loading (phr) | Mixing method | Elongation At Break (%) | Tensile Strength (MPa) | M300/ M100 | Tan delta 60 |
|---|---|---|---|---|---|---|
| 19A | 64.5 | 2 stage | 432 | 28.05 | 6.22 | 0.172 |
| 19B | 64.5 | 2 stage | 412 | 26.61 | 6.14 | 0.172 |
| 19C* | 50 | Dry mix | 533 | 30.83 | 5.09 | 0.206 |
| 19D* | 50 | Dry mix | 560 | 31.71 | 5.11 | 0.215 |
| 19E | 63 | 2 stage | 509 | 34.88 | 6.45 | 0.147 |
| 3A | 63.5 | 2 stage w/NR | 442 | 32.28 | 6.85 | 0.161 |

Example 20

This example demonstrates the dilution of elastomer composite incorporating a carbon black having COAN of 105 mL/100 g and STSA of 170 m²/g.

Neat elastomer composites with a carbon black loading of 63.3 (starting material for Examples 20 A, B, D, E), 57.0 (starting material for Example 20C), and 48.1 (starting material for Example 20F) phr of an experimental carbon black obtained from Cabot Corporation and produced according to USRE28974 (CEB 1, COAN of 105 mL/100 g and STSA of 170 m²/g) were prepared according to the Wet Masterbatch Methods. Examples 20A-E were diluted with natural rubber to produce 48.1 phr elastomer composite blends. Examples 20 A-C and F were processed using the two-stage procedure described in the Wet Masterbatch Methods. For Examples D and E, the stage 1 mixing time totaled 180 seconds; the elastomer composite was premasticated for 30 seconds before the addition of the virgin natural rubber, and the two rubbers were blended 30 seconds before the other ingredients in Table 1 were added. A material produced as described for Dry Mixed Samples (48.1 phr carbon black in natural rubber, Example 20I) is also shown for comparison. The mechanical properties of the resulting vulcanized elastomer composites and elastomer composite blends (all with a final loading of 48.1 phr) are shown in Table 29 below. Increasing the amount of dilution (e.g., by increasing the initial carbon black loading of the neat elastomer composite) increases the magnitude of the improvement with respect to neat material produced at the target loading (48.1 phr carbon black). The vulcanized elastomer composite blends exhibited a modulus ratio of about 0.9 to about 1.4 greater than that of the dry mixed samples.

TABLE 29

| Example | Original CB loading (phr) | Mixing notes | Elongation At Break (%) | Tensile Strength (MPa) | M300/ M100 | Tan delta 60 |
|---|---|---|---|---|---|---|
| 20A | 63.3 | 2 stage | 506 | 35.84 | 7.35 | 0.164 |
| 20B | 63.3 | 2 stage | 459 | 32.61 | 7.14 | 0.166 |
| 20C | 57.0 | 2 stage | 517 | 35.40 | 6.59 | 0.187 |
| 20D | 63.3 | 2 stage, premix | 501 | 35.47 | 6.86 | 0.182 |
| 20E | 63.3 | 2 stage, premix | 521 | 35.86 | 6.84 | 0.174 |
| 20F* | 48.1 | 2 stage | 530 | 35.33 | 6.41 | 0.203 |
| 20G* | 48.1 | Dry mix | 547 | 34.52 | 5.95 | 0.186 |

*Comparative Example

Neat elastomer composites with a carbon black loading of 63.3 (Examples 20H, I) and 57.0 (Example 20J) phr of CEB 1 carbon black were diluted with BR as described in connection with Examples 16-19 using the two stage mixing procedure to produce an elastomer composite blend with a carbon black loading of 48.1 phr. A dry mixed material (Example 20K) was prepared with the same carbon black loading and 24 phr of BR, corresponding to the amount of BR used to dilute the 63.3 phr elastomer composite. The mechanical properties of the resulting vulcanized elastomer composites and elastomer composite blends (all with a final loading of 48.1 phr) are shown in Table 30 below. The use of a wet masterbatch to produce natural rubber/synthetic blends results in dramatic improvements (1.1-1.3) in modulus ratio with respect to dry mixed elastomer composites. Increasing the degree of dilution improves tan delta 60 without negatively impacting modulus ratio. Dilution resulting in a decrease of 10 phr in the loading level improves the modulus ratio without reducing the tan delta 60 in comparison to dry mixed samples. The modest changes in tan delta 60 relative to that of dry mixed material are probably due to poor dispersion of the carbon black in the dry mixed material, which tends to reduce tan delta.

TABLE 30

| Example | Original CB loading (phr) | Mixing notes | Elongation At Break (%) | Tensile Strength (MPa) | M300/ M100 | Tan delta 60 |
|---|---|---|---|---|---|---|
| 20H | 63.3 | 2 stage | 504 | 32.74 | 6.47 | 0.156 |
| 20I | 63.3 | 2 stage | 511 | 32.48 | 6.30 | 0.163 |

TABLE 30-continued

| Example | Original CB loading (phr) | Mixing notes | Elongation At Break (%) | Tensile Strength (MPa) | M300/ M100 | Tan delta 60 |
|---|---|---|---|---|---|---|
| 20J* | 57.0 | 2 stage | 518 | 33.19 | 6.26 | 0.186 |
| 20K* | 48.1 | Dry, w/BR | 513 | 32.47 | 5.16 | 0.167 |

*Comparative Example

Example 21

This example demonstrates the dilution of elastomer composite incorporating a carbon black having COAN of 102 mL/100 g and STSA of 206 m²/g.

Neat elastomer composites with a carbon black loading of 63.0 (starting material for Examples 21 A, B, C), 58.2 (starting material for Example 21D), and 40.7 (starting material for Example 21E, F) phr of an experimental carbon black obtained from Cabot Corporation and produced according to USRE28974 (CEB 2, COAN of 102 mL/100 g and STSA of 206 m²/g) were prepared according to the Wet Masterbatch Methods. The curative package was used as in Table 1. Examples 21A-D were diluted with natural rubber to produce 40.7 phr elastomer composite blends. Examples 21 A, D, E, and F were processed using the two-stage procedure described in the Wet Masterbatch Methods. For Examples 21B and C, the stage 1 mixing time totaled 180 seconds; the elastomer composite was premasticated for 30 seconds before the addition of the virgin natural rubber, and the two rubbers were blended 30 seconds before the other ingredients in Table 1 were added. The mechanical properties of the resulting vulcanized elastomer composites and elastomer composite blends (all tested at a final loading of 40.7 phr) are shown in Table 31 below. Materials produced as described for Dry Mixed Samples (40.7 phr carbon black in natural rubber: Example 21G, H) are also shown for comparison. Increasing the amount of dilution improved both modulus ratio (by at least 1 depending on the mixing conditions) and hysteresis (tan delta 60).

TABLE 31

| Example | Original CB loading (phr) | Mixing notes | Elongation At Break (%) | Tensile Strength (MPa) | M300/ M100 | Tan delta 60 |
|---|---|---|---|---|---|---|
| 21A | 63.0 | 2 stage | 540 | 36.52 | 6.62 | 0.140 |
| 21B | 63.0 | 2 stage, premix | 564 | 37.07 | 6.60 | 0.158 |
| 21C | 63.0 | 2 stage, premix | 538 | 29.20 | 5.09 | 0.145 |
| 21D | 58.2 | 2 stage | 566 | 35.25 | 6.17 | 0.179 |
| 21E* | 40.7 | 2 stage | 597 | 39.35 | 6.18 | 0.181 |
| 21F* | 40.7 | 2 stage | 593 | 39.00 | 6.29 | 0.179 |
| 21G* | 40.7 | Dry mix, | 621 | 36.58 | 5.40 | 0.190 |
| 21H* | 40.7 | Dry mix, | 600 | 38.14 | 5.69 | 0.171 |

*Comparative Example

Neat elastomer composites with a carbon black loading of 63.0 (Example 21 I, J) and 58.2 (Example 21L) phr of CEB 2 carbon black were diluted with BR as described in connection with Examples 16-19 to produce an elastomer composite blend with a carbon black loading of 40.7 phr. All samples were prepared using the two stage mixing method. Dry mixed material was prepared with the same carbon black loading and 36 phr (Example 21K) of BR, corresponding to the amount of BR used to dilute the wet masterbatch starting materials with 63.0 phr carbon black, as described in connection with Examples 16-19. The mechanical properties of the resulting vulcanized elastomer composites and elastomer composite blends (all with a final loading of 40.7 phr) are shown in Table 32 below. The use of a wet masterbatch to produce natural rubber/synthetic blends results in dramatic improvements in modulus ratio (by as much as 1) with respect to dry mixed elastomer composites.

TABLE 32

| Example | Original CB loading (phr) | Mixing notes | Elongation At Break (%) | Tensile Strength (MPa) | M300/ M100 |
|---|---|---|---|---|---|
| 21I | 63.0 | 2 stage | 507 | 27.39 | 5.48 |
| 21J | 63.0 | 2 stage | 508 | 26.22 | 5.16 |
| 21K* | 40.7 | Dry mix, w/BR | 505 | 29.23 | 4.47 |
| 21L* | 58.2 | 2 stage | 533 | 29.44 | 5.31 |

*Comparative Example

Neat elastomer composites with a carbon black loading of 63.0 of CEB 2 carbon black were diluted with natural rubber as described in the Wet Masterbatch Methods (Examples 21 M, N, O) or with BR (Example 21P) as described in connection with Examples 16-19 to produce an elastomer composite blend with a carbon black loading of 50 phr. All samples were prepared using the two stage mixing method. For Examples 21N and O, the stage 1 mixing time totaled 180 seconds; the elastomer composite was premasticated for 30 seconds before the addition of the virgin natural rubber, and the two rubbers were blended 30 seconds before the other ingredients in Table 1 were added. Dry mixed material was prepared with the same carbon black loading and 26 phr of BR (Example 21Q), corresponding to the amount of BR used to dilute the wet masterbatch starting materials. The mechanical properties of the resulting vulcanized elastomer composites and elastomer composite blends (all with a final loading of 50 phr) are shown in Table 33 below. A dry mixed material with no BR (i.e. 50 phr carbon black in natural rubber, Example 21R) is also shown for comparison. The use of a wet masterbatch to produce natural rubber/synthetic blends results in dramatic improvements in modulus ratio (e.g., about 1 for dilution with natural rubber) with respect to dry mixed elastomer composites.

TABLE 33

| Example | Original CB loading (phr) | Mixing notes | Elongation At Break (%) | Tensile Strength (MPa) | M300/ M100 |
|---|---|---|---|---|---|
| 21M | 63.0 | 2 stage | 504 | 36.10 | 6.62 |
| 21N | 63.0 | 2 stage, premix | 517 | 35.60 | 6.77 |
| 21O | 63.0 | 2 stage, premix | 516 | 36.13 | 6.64 |
| 21P | 63.0 | 2 stage w/BR | 528 | 34.15 | 6.20 |
| 21Q* | 50.0 | Dry mix w/BR | 512 | 33.28 | 4.50 |
| 21R* | 50.0 | Dry mix, no BR | 537 | 34.05 | 5.71 |

*Comparative Example

Example 22

This example demonstrates the dilution of elastomer composite incorporating a carbon black having COAN of 69 mL/100 g and STSA of 155 m²/g.

Neat elastomer composites with a carbon black loading of 80 phr of an experimental carbon black obtained from Cabot Corporation and produced according to US RE28974 (CEB 3, COAN of 69 mL/100 g and STSA of 155 m²/g) were prepared according to the Wet Masterbatch Methods and diluted with natural rubber to produce 50 phr elastomer composite blends (Examples 22 A-D). Examples 22 A and B were processed using the two stage mixing procedure. For Examples 22 C and D, the two stage mixing procedure was varied: the stage 1 mixing time totaled 180 seconds; the elastomer composite was premasticated for 30 seconds before the addition of the virgin natural rubber, and the two rubbers were blended 30 seconds before the other ingredients in Table 1 were added. Examples 22 E and F were prepared by making elastomer composite with 80 phr CEB3 carbon black according to the Wet Masterbatch Methods, but using a one stage mixing procedure to dilute the elastomer composite with BR (see Examples 16-19). Dry mixed material was prepared as for Dry Mixed Samples using the same carbon black loading and 38 phr of BR (Example 22G, H), corresponding to the amount of BR used to dilute the wet masterbatch starting materials. The mechanical properties of the resulting vulcanized elastomer composites and elastomer composite blends (all with a final loading of 50 phr) are shown in Table 34 below. Dry mixed elastomer composite prepared with 50 phr CEB3 carbon black and natural rubber is shown for comparison. The data show that dilution of wet masterbatch with additional natural rubber improves modulus ratio by at least 0.5 with respect to dry mixed compositions. The use of wet masterbatch techniques to produce BR blends improves modulus ratio by about 1 with respect to dry mix compounds of the same composition. In the BR blends, the magnitude of the benefit to modulus ratio provided by the use of wet masterbatch methods is similar to that exhibited in compounds prepared with N134 carbon black (see Example 16A, B; note lower amount of BR in these samples, which had a starting loading of 63.1 phr carbon black).

TABLE 34

| Example | Original CB loading (phr) | Mixing notes | Elongation At Break (%) | Tensile Strength (MPa) | M300/ M100 |
|---|---|---|---|---|---|
| 22A | 80 | 2 stage | 570 | 34.26 | 6.48 |
| 22B | 80 | 2 stage | 607 | 33.82 | 6.60 |
| 22C | 80 | 2 stage, premix | 581 | 34.96 | 6.41 |
| 22D | 80 | 2 stage, premix | 570 | 36.62 | 6.71 |
| 22E | 80 | 1 stage w/BR | 466 | 22.33 | 5.48 |
| 22F | 80 | 1 stage w/BR | 398 | 18.97 | 5.60 |
| 22G* | 50 | Dry mix w/BR | 590 | 31.91 | 4.42 |
| 22H* | 50 | Dry mix w/BR | 593 | 32.13 | 4.38 |
| 22I* | 50 | Dry mix, no BR | 595 | 35.44 | 5.56 |
| 22J* | 50 | Dry mix, no BR | 605 | 35.19 | 5.74 |

*Comparative Example

Example 23

This example demonstrates the dilution of elastomer composite incorporating a carbon black having COAN of 72 mL/100 g and STSA of 190 m²/g.

Neat elastomer composites with an experimental carbon black obtained from Cabot Corporation and produced according to US RE28974 (CEB 4, COAN of 72 mL/100 g and STSA of 190 m²/g) were prepared according to the Wet Masterbatch Methods. Certain of these elastomer composites were diluted with natural rubber, butadiene rubber, or isoprene rubber to produce elastomer composite blends. All wet masterbatch samples except for Examples 23C and D were processed using the two stage mixing procedure. For Examples 23 C and D, the two stage mixing procedure was varied: the stage 1 mixing time totaled 180 seconds; the elastomer composite was premasticated for 30 seconds before the addition of the virgin natural rubber, and the two rubbers were blended 30 seconds before the other ingredients in Table 1 were added. Dry mixed material was prepared as for Dry Mixed Samples using the same carbon black loading and varying amounts of BR to correspond with the amount of BR added to the wet masterbatch blends. The initial and final carbon black loadings of the wet masterbatch samples and the appropriate comparisons for the dry mixed samples are given in Table 35. The mechanical properties of the resulting vulcanized elastomer composites and elastomer composite blends are shown in Table 36 below.

TABLE 35

| Example | Initial CB Loading (phr) | Final CB Loading (phr) | Second Rubber | Mixing Notes |
|---|---|---|---|---|
| 23A | 64.8 | 54.7 | NR | Two stage |
| 23B | 64.8 | 50.0 | NR | Two stage |
| 23C | 64.8 | 50.0 | NR | Two stage with premix |
| 23D | 64.8 | 50.0 | NR | Two stage with premix |
| 23E | 59.8 | 54.7 | NR | Two stage |
| 23F* | 64.8 | 54.7 | BR | Two stage |
| 23G | 64.8 | 54.7 | BR | Two stage |
| 23H* | — | 54.7 | 16 phr BR | Dry mix |
| 23I* | — | 54.7 | — | Dry Mix |
| 23J | 64.8 | 50.0 | BR | Two stage |
| 23K* | — | 50.0 | 23 phr BR | Dry Mix |
| 23L* | — | 50.0 | — | Dry Mix |
| 23M | 59.8 | 54.7 | BR | Two stage |
| 23N* | 64.8 | 50.0 | IR | Two stage |
| 23O | 64.8 | 50.0 | IR | Two stage |

*Comparative Example

TABLE 36

| Example | Elongation At Break (%) | Tensile Strength (MPa) | M300/ M100 |
|---|---|---|---|
| 23A | 615 | 38.04 | 6.14 |
| 23B | 636 | 38.56 | 5.73 |
| 23C | 642 | 39.54 | 5.91 |
| 23D | 635 | 39.43 | 6.00 |
| 23E | 584 | 36.35 | 6.13 |
| 23F* | 656 | 37.52 | 5.44 |
| 23G | 631 | 36.75 | 5.61 |
| 23H* | 570 | 34.43 | 4.55 |
| 23I* | 605 | 36.88 | 5.29 |
| 23J | 650 | 37.01 | 5.09 |
| 23K* | 598 | 32.55 | 4.31 |
| 23L* | 626 | 36.41 | 5.28 |
| 23M | 578 | 35.94 | 6.12 |
| 23N* | 651 | 33.99 | 4.65 |
| 23O | 655 | 34.68 | 4.74 |

*Comparative Example

The data demonstrate that dilution of elastomer composites having CEB 4 carbon black can result in an improvement in modulus ratio of about 0.5 or more with respect to dry mixed composites of the same composition.

Figure 12A:
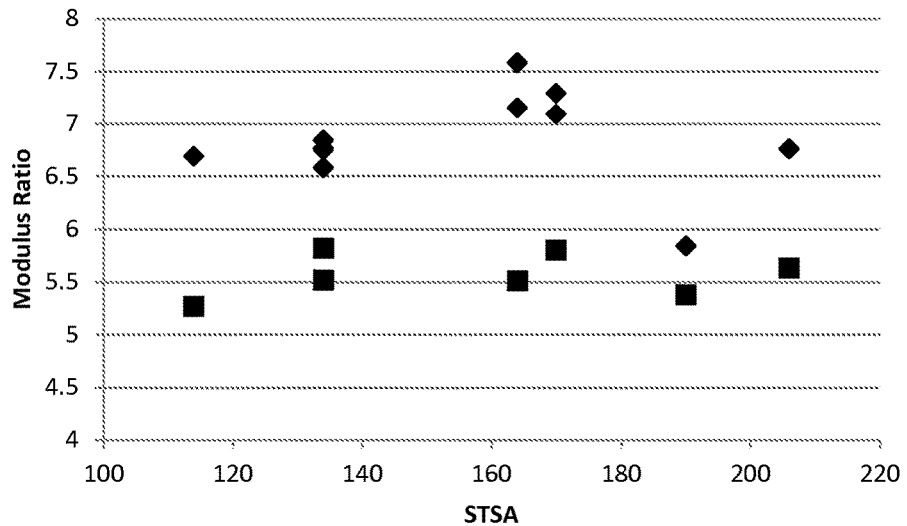
FIG. 12A illustrates the variation in modulus ratio for diluted natural rubber elastomer composite blends produced by wet masterbatch methods (diamonds) and for neat elastomer composites produced by dry mixing methods (squares) with respect to surface area.

FIG. 12A illustrates the variation in modulus ratio for diluted natural rubber elastomer composite blends produced by wet masterbatch methods (diamonds) from the above Examples with respect to surface area. All compounds were prepared by two stage mixing without premastication. All wet masterbatch compounds were diluted to reduce the carbon black loading between 13 and 17 phr from about 63-68 phr carbon black. The values for corresponding dry mix elastomer composites (squares) from the Examples are also shown. CEB 4 (STSA of 190) also has a much lower COAN than the other carbon blacks represented in the figure, resulting in lower modulus ratio for the wet masterbatch blend.

Figure 12B:
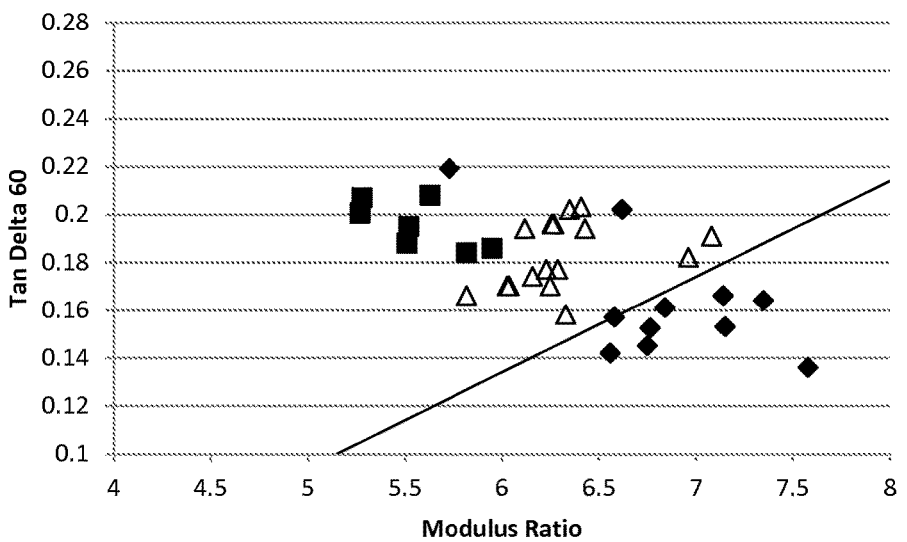
FIG. 12B illustrates the variation in tan delta 60 with modulus ratio for diluted natural rubber elastomer composite blends produced by wet masterbatch methods (diamonds) and neat elastomer composites produce by dry mixing methods (squares) and wet masterbatch methods (triangles).

FIG. 12B plots tan delta 60 versus modulus ratio for the same compounds (diamonds—wet masterbatch followed by dilution, squares—dry mixing). The triangles represent neat elastomer composite with 50 phr carbon black from the above Examples produced via wet masterbatch methods. There is a clear improvement (higher modulus ratio, lower tan delta 60) from the dry mixed samples to the neat elastomer composites produced by wet masterbatch methods to the elastomer composites produced by diluting elastomer composites produced by wet masterbatch methods. The line (tan delta 60)=0.04 (modulus ratio)–0.106 effectively divides the elastomer composite blends from the from the neat elastomer composites produced by either dry mixing or wet masterbatch methods.

Figure 13:
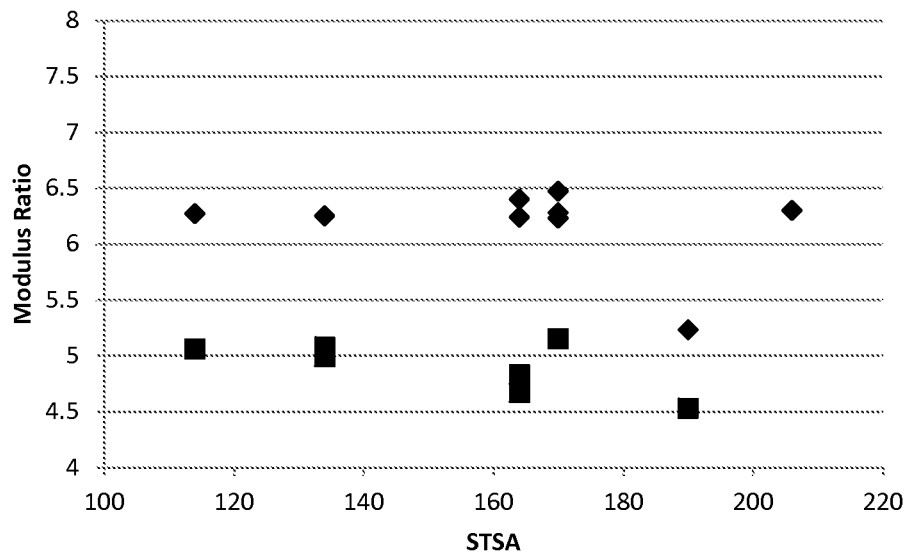
FIG. 13 illustrates the variation with surface area in modulus ratio for elastomer composites produced by wet masterbatch methods and diluted with BR (diamonds) and for elastomer composites of the same composition produced by dry mixing methods (squares).

FIG. 13 illustrates the variation with surface area in modulus ratio for natural rubber elastomer composites from Examples 16-24 produced by wet masterbatch methods and diluted with BR. All compounds were prepared by two stage mixing without premastication. All wet masterbatch compounds were blended with sufficient BR to reduce the carbon black loading between 13 and 17 phr from about 63-68 phr carbon black. The values for corresponding dry mix elastomer composites containing the same amounts of carbon black and BR are also shown. The modulus ratio is relatively constant with surface area except for elastomer composites with CEB 4 carbon black, which has a much lower COAN than the other carbon blacks depicted in the graphs. In contrast, the modulus ratios for the dry mixed blends decrease with increasing surface area, indicating a decline in dispersion quality.

Figure 14:
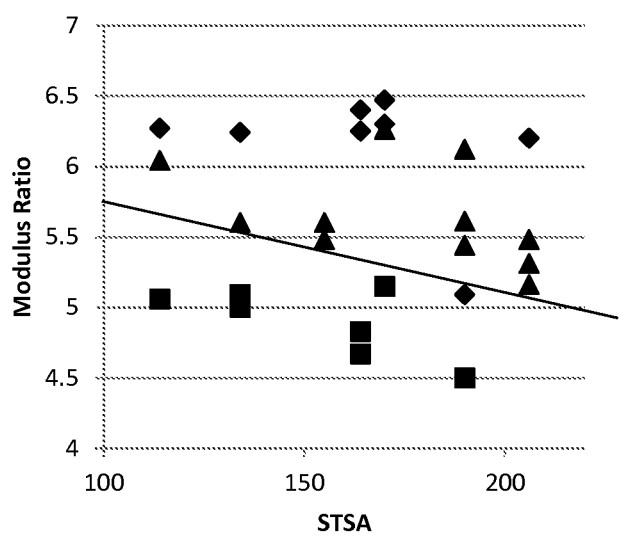
FIG. 14 duplicates the information in FIG. 13 but adds the modulus ratios for other elastomer composite blends in Examples 16-24 that were produced by adding varying amounts of BR to neat elastomer composite produced by wet masterbatch methods and having varying amounts of carbon black (depicted with triangles) (diamonds and squares as for FIG. 13).

FIG. 14 duplicates the information in FIG. 13 but adds the modulus ratios for the other elastomer composite blends in Examples 16-24 that were produced by adding varying amounts of BR to neat elastomer composite produced by wet masterbatch methods and having varying amounts of carbon black (depicted with triangles; squares and diamonds are as for FIG. 13). The line M300/M100=–0.0064 (STSA)+6.39 effectively divides the wet masterbatch blends from the dry mixed blends.

Figure 15:
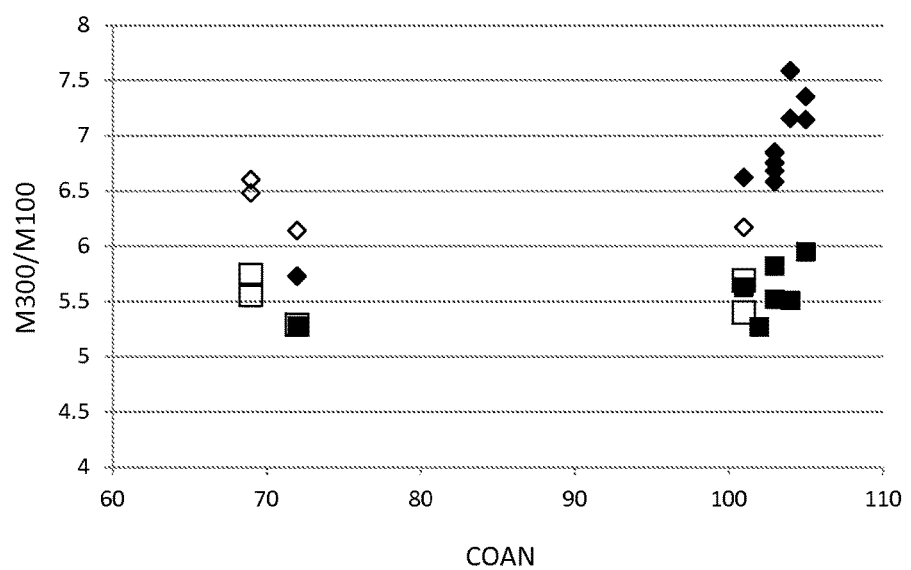
FIG. 15 illustrates the variation of modulus ratio with COAN for various natural rubber elastomer composite blends produced by wet masterbatch methods from the Examples and diluted with NR.

FIG. 15 illustrates the variation of modulus ratio with COAN for vulcanized elastomer composite blends produced by wet masterbatch methods from the Examples above and in which the second elastomer material was NR. All compounds were prepared by two stage mixing without premastication. The solid diamonds correspond to wet masterbatch compounds diluted with natural rubber to reduce the carbon black loading between 13 and 17 phr from about 63-68 phr carbon black. The values for corresponding dry mix elastomer composites (filled squares) from the Examples are also shown. The open diamonds correspond to additional wet masterbatch blends from the Examples with different amounts of dilution and different final carbon black loadings. The open squares correspond to dry mixed composites having the same composition as the wet masterbatch blends represented by the open diamonds.

The data in the Examples and FIG. 15 show that the improvement in modulus ratio provided by the use of wet masterbatch blends (in comparison with dry mixed elastomer composites) increases with the structure of the carbon black used in the elastomer composite blend.

Example 24

This example demonstrates the dilution of elastomer composite incorporating a carbon black having COAN of 69 mL/100 g and STSA of 135 m$^2$/g.

Neat elastomer composites with a carbon black loading of 56.5 phr of an experimental carbon black obtained from Cabot Corporation and produced according to US Patent RE 28974 (CEB 5, COAN of 69 mL/100 g and STSA of 135 m$^2$/g) were prepared according to the Wet Masterbatch Methods and diluted with natural rubber to produce 47.5 phr elastomer composite blends (Examples 24A-C). Example 24A was processed using the two stage mixing procedure. For Example 24B, the two stage mixing procedure was varied: the stage 1 mixing time totaled 180 seconds; the elastomer composite was premasticated for 30 seconds before the addition of the virgin natural rubber, and the two rubbers were blended 30 seconds before the other ingredients in Table 1 were added. Example 24C was prepared using the one stage mixing protocol. In addition, unblended (neat) elastomer composites were prepared by the Wet Masterbatch Methods with 47.5 phr of CEB 5 carbon black and compounded using two stage (Example 24D) and one stage (Example 24E) techniques but without adding a second rubber. Example 24H was prepared by making elastomer composite with 56.5 phr CEB5 carbon black according to the Wet Masterbatch Methods described above and diluting the elastomer composite with BR as described for Examples 16-19. Examples 24F and G were produced as for Dry Mixed Samples with 47.5 phr CEB5 type carbon black and natural rubber. The mechanical properties of the resulting vulcanized elastomer composites and elastomer composite blends (all with a final loading of 47.5 phr) are shown in Table 37 below. The results show that dilution results in modest change in the modulus ratio; it is expected that the improvement would exceed 0.5 at higher levels of dilution. Thus, the use of a wet masterbatch is a useful option for providing concentrated, well dispersed carbon black for use in elastomer composite blends having superior tensile performance.

TABLE 37

| Example | Original CB loading (phr) | Mixing notes | Elongation At Break (%) | Tensile Strength (MPa) | M300/M100 |
| --- | --- | --- | --- | --- | --- |
| 24A | 56.5 | 2 stage | 602 | 37.66 | 6.01 |
| 24B | 56.5 | 2 stage, premix | 605 | 37.65 | 5.97 |
| 24C | 56.5 | 1 stage | 587 | 38.27 | 6.33 |
| 24D* | 47.5 | 2 stage | 590 | 36.82 | 6.08 |
| 24E | 47.5 | 1 stage | 575 | 37.19 | 6.13 |
| 24F* | 47.5 | Dry mix | 619 | 36.31 | 5.73 |

TABLE 37-continued

| Example | Original CB loading (phr) | Mixing notes | Elongation At Break (%) | Tensile Strength (MPa) | M300/ M100 |
|---|---|---|---|---|---|
| 24G* | 47.5 | Dry mix | 638 | 37.90 | 5.44 |
| 24H | 56.5 | 2 stage w/BR | 601 | 34.66 | 5.82 |

*Comparative Example

Neat elastomer composite is produced by wet masterbatch methods incorporating 75, 65 and 50 phr of CEB 5 carbon black. The neat elastomer composites are diluted with natural rubber, butadiene rubber, styrene butadiene rubber, and isoprene rubber to achieve a final loading of 50 phr carbon black using both the one stage method and the two stage method discussed above. The modulus ratio and tan delta 60 of the elastomer composite blend are expected to be superior to those for dry mixed elastomer composites of the same composition. The same properties of elastomer composite blends incorporating NR are expected to be superior to those for undiluted neat elastomer composite produced by wet masterbatch methods.

Example 25

This example demonstrates the dilution of elastomer composite incorporating a carbon black having COAN of 101 mL/100 g and STSA of 230 m$^2$/g.

Neat elastomer composites with a carbon black loading of 45.6 phr of an experimental carbon black obtained from Cabot Corporation and produced according to US Patent RE 28974 (CEB 6, COAN of 101 mL/100 g and STSA of 230 m$^2$/g) were prepared according to the Wet Masterbatch Methods and diluted with natural rubber to produce 41.7 phr elastomer composite blends (Examples 25A-C). Example 25A was processed using the two stage mixing procedure. For Example 25B, the two stage mixing procedure was varied: the stage 1 mixing time totaled 180 seconds; the elastomer composite was premasticated for 30 seconds before the addition of the virgin natural rubber, and the two rubbers were blended 30 seconds before the other ingredients in Table 1 were added. Example 25C was prepared using the one stage mixing protocol. In addition, unblended (neat) elastomer composites were prepared by the Wet Masterbatch Methods with 41.7 phr of CEB 6 carbon black and compounded using two stage techniques without additional rubber (Example 25D). Example 25G was prepared by making elastomer composite with 45.6 phr CEB 6 carbon black according to the Wet Masterbatch Methods and diluting the elastomer composite with BR as described for Examples 16-19. Examples 25E and F were produced as for Dry Mixed Samples using 41.7 phr CEB 6 type carbon black and natural rubber. The mechanical properties of the resulting vulcanized elastomer composites and elastomer composite blends (all with a final loading of 41.7 phr) are shown in Table 38 below. For the wet masterbatch samples diluted with natural rubber, one stage mixing resulted in the best mechanical performance by providing noticeable improvement in modulus ratio (over 1) with respect to dry mix.

TABLE 38

| Example | Original CB loading (phr) | Mixing notes | Elongation At Break (%) | Tensile Strength (MPa) | M300/ M100 | Tan delta 60 |
|---|---|---|---|---|---|---|
| 25A | 45.6 | 2 stage | 648 | 37.48 | 6.29 | 0.21 |
| 25B | 45.6 | 2 stage, premix | 596 | 39.52 | 6.34 | 0.21 |
| 25C | 45.6 | 1 stage | 597 | 39.91 | 6.51 | 0.18 |
| 25D* | 41.7 | 2 stage | 618 | 40.81 | 6.43 | 0.21 |
| 25E* | 41.7 | Dry mix | 658 | 37.86 | 5.34 | 0.19 |
| 25F* | 41.7 | Dry mix | 607 | 35.03 | 5.38 | 0.19 |
| 25G | 45.6 | 2 stage w/BR | 603 | 38.59 | 6.18 | 0.18 |

*Comparative Example

Neat elastomer composite is produced by wet masterbatch methods incorporating 65 and 50 phr of CEB 6 carbon black. The neat elastomer composites are diluted with natural rubber, butadiene rubber, styrene butadiene rubber, and isoprene rubber to achieve a final loading of 50 phr carbon black using both the one stage method and the two stage method discussed above. The modulus ratio and tan delta 60 of the elastomer composite blend produced using NR via one stage mixing are expected to be superior than those for neat elastomer composite. The use of wet masterbatch methods provides elastomer composite blends incorporating synthetic rubber and exhibiting better reinforcement properties than dry mixed compounds of the same composition.

While this invention has been particularly shown and described with references to preferred implementations thereof, it will be understood by those skilled in the art that various changes in form and details may be made therein without departing from the scope of the invention encompassed by the appended claims.

What is claimed is:

1. A process for producing an elastomeric composition containing a filler, the process comprising:
    preparing an elastomer composite having less than 3% moisture comprising natural rubber and a first filler loading of carbonaceous aggregated filler having an STSA of at least 120 m$^2$/g, the first filler loading being greater than 60 phr, by a wet masterbatch method; and
    blending the elastomer composite with a second elastomer material comprising an elastomer and optional particulate filler to produce an elastomer composite blend having a second filler loading, the second filler loading being at least about 10 phr lower than the first filler loading, wherein M300/M100 of a vulcanizate of the elastomer composite blend is at least 0.5 higher than M300/M100 for a vulcanized elastomer composite of the same composition but prepared according to CTV Comparative Method 1.

2. The process of claim 1, wherein the M300/M100 of the vulcanized elastomer composite blend is at least (0.017*COAN-0.7) higher than M300/M100 for a vulcanized elastomer composite of the same composition but prepared according to CTV Comparative Method 1.

3. The process of claim 1, wherein the elastomer in the second elastomer material is natural rubber and the vulcanized elastomer composite blend satisfies tan delta 60≤0.04 (M300/M100)−0.106.

4. The process of claim 1, wherein the elastomer in the second elastomer material is a synthetic rubber and the vulcanized elastomer composite blend exhibits M300/M100 of at least −0.0064*STSA+6.39.

5. The process of claim 1, further comprising vulcanizing the elastomer composite blend.

6. The process of claim 1, wherein the wet mixing method comprises:
  i) combining a first fluid comprising elastomer latex with a second fluid comprising particulate filler;
  ii) causing the elastomer latex to coagulate, thereby forming masterbatch crumb; and
  iii) drying the masterbatch crumb.

7. The process of claim 1, further comprising, before blending, masticating the elastomer composite for 30-60 seconds.

8. The process of claim 7, wherein masticating comprises mixing the elastomer composite in an internal mixer at a fill factor of 70-85% for 30 to about 60 seconds.

9. The process of claim 1, wherein blending further includes adding a cross-linking agent to the elastomer composite, wherein the cross-linking agent and the second elastomer material are mixed with the elastomer composite simultaneously.

10. A process for producing an elastomeric composition containing a filler, the process comprising:
  preparing an elastomer composite having a moisture content less than 3% comprising natural rubber and a first filler loading of carbonaceous aggregated filler, the first filler loading being greater than 60 phr, by a wet masterbatch method; and
  blending the elastomer composite with a second elastomer material comprising natural rubber and optional particulate filler to produce an elastomer composite blend having a second filler loading, the second filler loading being at least about 10 phr lower than the first filler loading, wherein M300/M100 of a vulcanizate of the elastomer composite blend is at least 0.5 higher than M300/M100 for a vulcanized elastomer composite of the same composition but prepared according to CTV Comparative Method 1.

11. The process of claim 10, wherein the M300/M100 of the vulcanized elastomer composite blend is at least (0.017*COAN-0.7) higher than M300/M100 for a vulcanized elastomer composite of the same composition but prepared according to CTV Comparative Method 1.

12. The process of claim 10, wherein the elastomer in the second elastomer material is natural rubber and the vulcanized elastomer composite blend satisfies tan delta 60≤0.04 (M300/M100)−0.106.

13. The process of claim 10, further comprising vulcanizing the elastomer composite blend.

14. A process for producing an elastomeric composition containing a filler, the process comprising:
  providing an elastomer composite having less than 3% moisture comprising natural rubber and a first filler loading of carbonaceous aggregated filler having an STSA of at least 120 m²/g, the first filler loading being greater than 60 phr, by a wet masterbatch method; and
  blending the elastomer composite with a second elastomer material comprising an elastomer and optional particulate filler to produce an elastomer composite blend having a second filler loading, the second filler loading being at least about 10 phr lower than the first filler loading, wherein M300/M100 of a vulcanizate of the elastomer composite blend is at least 0.5 higher than M300/M100 for a vulcanized elastomer composite of the same composition but prepared according to CTV Comparative Method 1.

15. The process of claim 14, wherein the M300/M100 of the vulcanized elastomer composite blend is at least (0.017*COAN-0.7) higher than M300/M100 for a vulcanized elastomer composite of the same composition but prepared according to CTV Comparative Method 1.

16. The process of claim 14, wherein the elastomer in the second elastomer material is natural rubber and the vulcanized elastomer composite blend satisfies tan delta 60≤0.04 (M300/M100)−0.106.

17. The process of claim 14, wherein the elastomer in the second elastomer material is a synthetic rubber and the vulcanized elastomer composite blend exhibits M300/M100 of at least −0.0064*STSA+6.39.

18. A process for producing an elastomeric composition containing a filler, the process comprising:
  providing an elastomer composite having a moisture content less than 3% comprising natural rubber and a first filler loading of carbonaceous aggregated filler, the first filler loading being greater than 60 phr, by a wet masterbatch method; and
  blending the elastomer composite with a second elastomer material comprising natural rubber and optional particulate filler to produce an elastomer composite blend having a second filler loading, the second filler loading being at least about 10 phr lower than the first filler loading, wherein M300/M100 of a vulcanizate of the elastomer composite blend is at least 0.5 higher than M300/M100 for a vulcanized elastomer composite of the same composition but prepared according to CTV Comparative Method 1.

19. The process of claim 18, wherein the M300/M100 of the vulcanized elastomer composite blend is at least (0.017*COAN-0.7) higher than M300/M100 for a vulcanized elastomer composite of the same composition but prepared according to CTV Comparative Method 1.

20. The process of claim 18, wherein the elastomer in the second elastomer material is natural rubber and the vulcanized elastomer composite blend satisfies tan delta 60≤0.04 (M300/M100)−0.106.

* * * * *